(12) United States Patent
Lin et al.

(10) Patent No.: US 11,703,886 B2
(45) Date of Patent: *Jul. 18, 2023

(54) CONTROL METHOD, APPARATUS, AND DEVICE, AND UAV

(71) Applicant: SZ DJI TECHNOLOGY CO., LTD., Shenzhen (CN)

(72) Inventors: Canlong Lin, Shenzhen (CN); Zhimeng Shang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/646,768

(22) Filed: Jan. 3, 2022

(65) Prior Publication Data
US 2022/0129011 A1 Apr. 28, 2022

Related U.S. Application Data

(63) Continuation of application No. 16/457,305, filed on Jun. 28, 2019, now Pat. No. 11,216,013, which is a (Continued)

(51) Int. Cl.
G05D 1/08 (2006.01)
B64C 39/02 (2023.01)
(Continued)

(52) U.S. Cl.
CPC ............ *G05D 1/085* (2013.01); *B64C 39/024* (2013.01); *B64D 47/08* (2013.01); *G05D 1/0094* (2013.01); *B64U 2101/30* (2023.01)

(58) Field of Classification Search
CPC .... G05D 1/085; G05D 1/0094; B64C 39/024; B64C 2201/127; B64C 2201/14;
(Continued)

(56) References Cited

U.S. PATENT DOCUMENTS 9,632,509 B1 * 4/2017 Aphek .................... G05D 1/102
9,753,461 B1 * 9/2017 Johnson ............... G01R 31/085
(Continued)

FOREIGN PATENT DOCUMENTS

CN 202814399 U 3/2013
CN 103034247 A 4/2013
(Continued)

OTHER PUBLICATIONS

The World Intellectual Property Organization (WIPO) International Search Report for PCT/CN2016/113762 dated May 9, 2017 6 Pages.

*Primary Examiner* — Muhammad Shafi
(74) *Attorney, Agent, or Firm* — Anova Law Group, PLLC

(57) ABSTRACT

A control method includes obtaining one or more attitude parameters of a gimbal of a UAV and adjusting one or more attitude parameters of the UAV according to the one or more attitude parameters of the gimbal. The UAV includes a vehicle body, and a power system and the gimbal that are provided at the vehicle body. The power system includes a motor and a propeller and is configured to provide flight power for the UAV. The gimbal is configured to connect a photographing device to the vehicle body. Adjusting the one or more attitude parameters of the UAV includes adjusting a yaw parameter of the UAV according to the yaw parameter of the gimbal. Adjusting the yaw parameter of the UAV includes controlling the UAV to rotate in a yaw direction according to the yaw parameter of the gimbal, to cause the UAV to rotate along with the gimbal.

20 Claims, 11 Drawing Sheets

Related U.S. Application Data continuation of application No. PCT/CN2016/113762, filed on Dec. 30, 2016.

(51) Int. Cl.
*B64D 47/08* (2006.01)
*G05D 1/00* (2006.01)
*B64U 101/30* (2023.01)

(58) Field of Classification Search
CPC ... B64C 19/00; B64C 27/08; B64C 2201/024; B64D 47/08
USPC .......................................................... 701/4
See application file for complete search history.

(56) References Cited

U.S. PATENT DOCUMENTS

| | | | | |
|---|---|---|---|---|
| 2016/0347462 | A1* | 12/2016 | Clark | B64C 39/024 |
| 2017/0220046 | A1* | 8/2017 | Tsai | G01W 1/02 |
| 2017/0254473 | A1* | 9/2017 | Katz | F16M 11/123 |
| 2018/0004183 | A1* | 1/2018 | Smith | H04B 1/3877 |
| 2018/0115721 | A1* | 4/2018 | Zhao | H04N 5/23203 |

FOREIGN PATENT DOCUMENTS

| | | |
|---|---|---|
| CN | 104571126 A | 4/2015 |
| CN | 205327401 U | 6/2016 |
| CN | 105857595 A | 8/2016 |
| CN | 106155105 A | 11/2016 |
| CN | 106245524 A | 12/2016 |
| KR | 101662032 B1 | 10/2016 |

* cited by examiner

CONTROL METHOD, APPARATUS, AND DEVICE, AND UAV

CROSS-REFERENCE TO RELATED APPLICATIONS

This application is a continuation of U.S. application Ser. No. 16/457,305, filed on Jun. 28, 2019, now U.S. Pat. No. 11,216,013, which is a continuation of International Application No. PCT/CN2016/113762, filed on Dec. 30, 2016, the entire contents of both of which are incorporated herein by reference.

TECHNICAL FIELD

The present disclosure relates to unmanned aerial vehicle (UAV) technology and, more particularly, to a control method, apparatus, and device, and a UAV.

BACKGROUND

An unmanned aerial vehicle (UAV) is provided with a gimbal and the gimbal is provided with a photographing device, such as a camera, a video recorder, or the like. By adjusting the attitude of the gimbal, such as the pitch angle and the yaw angle, the photographing device is in different attitudes and shoots images or videos from different perspectives.

Currently, the attitude of the gimbal, such as the yaw angle or the roll angle, is adjusted along with the change of the attitude of the UAV. The ground control terminal sends the control command to the UAV and the control command instructs the UAV to adjust the flight attitude, such as the yaw angle. After the UAV adjusts the attitude of the vehicle body according to the control command, the attitude of the gimbal is adjusted along with the change of the attitude of the UAV. As such, on one hand, the control manner of the gimbal is inflexible, on the other hand, the attitude adjustment of the gimbal has a large lag compared to the attitude adjustment of the UAV's vehicle body. In addition, when the UAV stops to adjust the attitude of the vehicle body, the gimbal continuously adjusts the attitude under inertia, such that a certain overshoot of the gimbal occurs. As such, the shaking of the photographing device is induced, the jittering of the photographed image is caused, and the image quality is reduced.

SUMMARY

In accordance with the disclosure, there is provided a control method including obtaining one or more attitude parameters of a gimbal of an unmanned aerial vehicle (UAV) and adjusting one or more attitude parameters of the UAV according to the one or more attitude parameters of the gimbal.

Also in accordance with the disclosure, there is provided a control device including one or more processors individually or collectively configured to obtain one or more attitude parameters of a gimbal of an unmanned aerial vehicle (UAV) and adjust one or more attitude parameters of the UAV according to the one or more attitude parameters of the gimbal.

BRIEF DESCRIPTION OF THE DRAWINGS

In order to illustrate the technical solutions of the present disclosure, the drawings used in the description of embodiments will be briefly described. It will be appreciated that the drawings are part rather than all of the drawings of the present disclosure. Other drawings conceived by those having ordinary skills in the art on the basis of the described drawings without inventive efforts should fall within the scope of the present disclosure.

Figure 1:
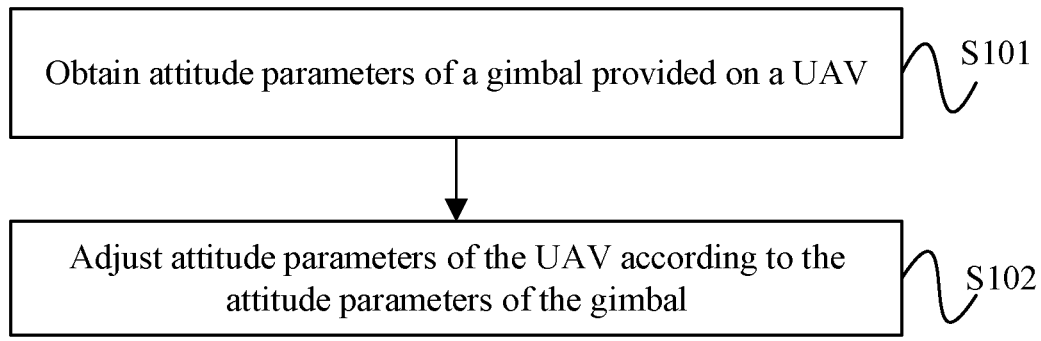
FIG. 1 is a flow chart of a control method according to the disclosure.

DESCRIPTION OF MAIN COMPONENTS AND REFERENCE NUMERALS roll axis 1
pitch axis 2
yaw axis 3
propeller 11
UAV's vehicle body 12
landing gear 13
gimbal 14
photographing device 15
photographing lens 16
photographing range 18
optical axis direction 17
target object 20
UAV 60
nose direction 61
nose 63
clockwise arc 64 counterclockwise arc 65
photographing direction 66
control apparatus 70
acquisition circuit 71
control circuit 72
receive circuit 73
control apparatus 80
receive circuit 81
control circuit 82
acquisition circuit 83
control device 90
processor 91
communication interface 92
UAV 100
motor 107
propeller 106
electronic governor 117
control device 118
sensor system 108
communication system 110
support device 102
photographing device 104
ground station 112
antenna 114
electromagnetic waves 116

DETAILED DESCRIPTION OF THE
EMBODIMENTS

Technical solutions of the present disclosure will be described with reference to the drawings. It will be appreciated that the described embodiments are part rather than all of the embodiments of the present disclosure. Other embodiments conceived by those having ordinary skills in the art on the basis of the described embodiments without inventive efforts should fall within the scope of the present disclosure.

As used herein, when a first component is referred to as "fixed to" a second component, it is intended that the first component may be directly attached to the second component or may be indirectly attached to the second component via another component. When a first component is referred to as "connecting" to a second component, it is intended that the first component may be directly connected to the second component or may be indirectly connected to the second component via a third component between them.

Unless otherwise defined, all the technical and scientific terms used herein have the same or similar meanings as generally understood by one of ordinary skill in the art. As described herein, the terms used in the specification of the present disclosure are intended to describe example embodiments, instead of limiting the present disclosure. The term "and/or" used herein includes any suitable combination of one or more related items listed.

Example embodiments will be described with reference to the accompanying drawings. In the situation where the technical solutions described in the embodiments are not conflicting, they can be combined.

FIG. 1 is a flow chart of an example control method consistent with the disclosure.

As shown in FIG. 1, at S101, attitude parameters of a gimbal provided at an unmanned aerial vehicle (UAV) are obtained.

Figure 2A:
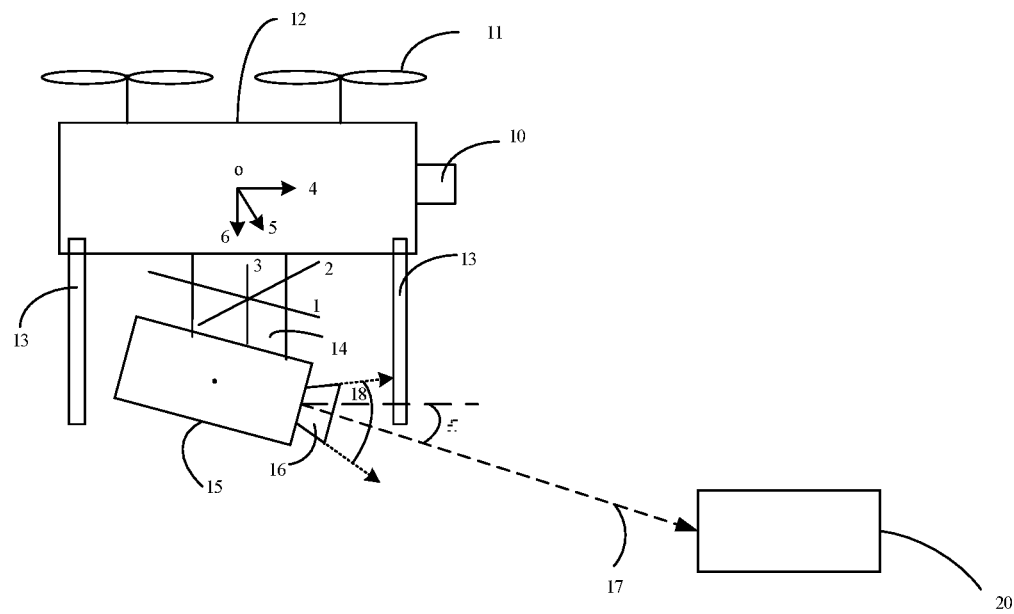
FIG. 2A schematically shows attitude parameters of a gimbal provided at an unmanned aerial vehicle (UAV).

FIG. 2A schematically shows the attitude parameters of the gimbal 14 provided at the UAV. As shown in FIG. 2A, a nose of the UAV is denoted as 10, propellers are denoted as 11, a vehicle body of the UAV is denoted as 12, the gimbal provided at the UAV is denoted as 14, a photographing device carried by the UAV is denoted as 15, the photographing device 15 is connected to the vehicle body 12 of the UAV via the gimbal 14, a photographing lens (also simply referred to as a "lens") of the photographing device 15 is denoted as 16, an optical axis direction of the photographing lens 16 is denoted as 17, a photographed target object of the photographing lens 16 is denoted as 20, and the optical axis direction 17 points to the photographed target object 20 and denotes a photographing direction of the photographing device 15.

In some embodiments, the gimbal 14 can be a three-axis gimbal. That is, the gimbal 14 can rotate around a roll axis, a pitch axis, and a yaw axis. As shown in FIG. 2A, the roll axis of the gimbal is denoted as 1, the pitch axis of the gimbal is denoted as 2, and the yaw axis of the gimbal is denoted as 3. When the gimbal rotates around the roll axis 1, i.e., the roll axis 1 is taken as the rotation axis, a roll angle of the gimbal changes. When the gimbal rotates around the pitch axis 2, i.e., the pitch axis 2 is taken as the rotation axis, a pitch angle of the gimbal changes. When the gimbal rotates around the yaw axis 3, i.e., the yaw axis 3 is taken as the rotation axis, a yaw angle of the gimbal changes. When the gimbal 14 rotates around one or more of the roll axis, the pitch axis, and the yaw axis of the gimbal 14, the photographing device 15 can rotate along with the rotation of the gimbal 14, such that the photographing device 15 can photograph the target object 20 from different photographing directions and photographing angles.

In some embodiments, the executing entity can be a flight controller of the UAV or a control circuit having processing capacity. In some embodiments, the attitude parameters of the gimbal can include one or more of yaw parameters, pitch parameters, and roll parameters. The yaw parameters can include the yaw angle of the gimbal or a yaw rotation speed of the gimbal, for example, an angular velocity of the gimbal 14 rotating around the yaw axis. The pitch parameters can include the pitch angle of the gimbal 14 or a pitch rotation speed of the gimbal 14, for example, an angular velocity of the gimbal 14 rotating around the pitch axis. The roll parameters can include the roll angle of the gimbal 14 or a roll rotation speed of the gimbal 14, for example, an angular velocity of the gimbal rotating around the roll axis.

In some embodiments, after the gimbal rotates, one or more attitude angles of the gimbal after the rotation, such as one or more of the yaw angle, the pitch angle, and the roll angle, can be sent to the flight controller of the UAV. The flight controller of the UAV can also actively acquire the attitude angles of the gimbal after the rotation, such as one or more of the yaw angle, the pitch angle, and the roll angle. During the rotation of the gimbal, the rotation speed of the gimbal in the rotation direction can also be sent to the flight controller of the UAV. For example, when the gimbal 14 rotates around the yaw axis, i.e., the gimbal rotates in the yaw direction, the gimbal can send the yaw angle to the flight controller of the UAV in real time and can also send the angular velocity of the gimbal 14 rotating around the yaw axis to the flight controller. Similarly, the gimbal 14 can send the angular velocity of the gimbal 14 rotating around the pitch axis or rotating around the roll axis to the flight controller.

At S102, attitude parameters of the UAV are adjusted according to the attitude parameters of the gimbal.

When the UAV is flying, the attitude parameters of the UAV can include one or more of yaw parameters, pitch parameters, and roll parameters. The yaw parameters can include a yaw angle of the UAV or a yaw rotation speed of the UAV, for example, an angular velocity of the UAV rotating around the yaw axis. The pitch parameters can include a pitch angle of the UAV or a pitch rotation speed of the UAV, for example, an angular velocity of the UAV rotating around the pitch axis. The roll parameters can include a roll angle of the UAV or a roll rotation speed of the UAV, for example, an angular velocity of the UAV rotating around the roll axis. In some embodiments, the flight controller of the UAV can adjust the attitude parameters of the UAV, according to the attitude parameters of the gimbal 14.

As shown in FIG. 2A, a center of the vehicle body 12 of the UAV is denoted as o, and the center can be a centroid of the UAV. A direction through the center o and pointing to the nose of the UAV 10 is the X axis of a vehicle body coordinate system corresponding to the UAV and is denoted by arrow 4. A direction through the center o and pointing to a right side of the vehicle body 12 of the UAV is the Y axis of the vehicle body coordinate system and is denoted by arrow 5. A direction through the center o and pointing to a bottom side of the vehicle body 12 of the UAV is the Z axis of the vehicle body coordinate system and is denoted by arrow 6. The X-axis, Y-axis, and Z-axis of the vehicle body coordinate system follow the right-hand rule. The X axis of the vehicle body coordinate system is the roll axis of the UAV, the Y axis of the vehicle body coordinate system is the pitch axis of the UAV, and the Z axis of the vehicle body coordinate system is the yaw axis of the UAV.

The flight controller adjusting the attitude parameters of the UAV based on the attitude parameters of the gimbal 14 can include the following implementation manners.

An implementation manner is that the one or more of the yaw parameters, the pitch parameters, and the roll parameters of the UAV can be controlled, according to the one or more of the yaw parameters, the pitch parameters, and the roll parameters of the gimbal.

In some embodiments, the flight controller can adjust the yaw parameters of the UAV according to the yaw parameters of the gimbal, adjust the pitch parameters of the UAV according to the pitch parameters of the gimbal, and/or adjust the roll parameters of the UAV according to the roll parameters of the gimbal.

For example, when the gimbal 14 rotates around the yaw axis of the gimbal 14, the flight controller can control the UAV to rotate along with the rotation of the gimbal 14. That is, the vehicle body of the UAV can also be controlled to rotate around the yaw axis of the UAV. In some embodiments, the angular velocity of the UAV rotating around the yaw axis of the UAV can be adjusted according to the angular velocity of the gimbal 14 rotating around the yaw axis of the gimbal 14. In some embodiments, when the gimbal 14 rotates around the yaw axis of the gimbal 14, the yaw angle of the UAV can be adjusted in real time according to the yaw angle of the gimbal 14. Similarly, when the gimbal rotates around the roll axis or the pitch axis of the gimbal, the vehicle body of the UAV can be controlled to rotate around the roll axis or the pitch axis of the UAV.

In some embodiments, when the gimbal rotates around the roll axis and the pitch axis of the gimbal, the vehicle body of the UAV can be controlled to rotate around the roll axis and the pitch axis of the UAV.

In some other embodiments, when the gimbal rotates around the roll axis and the pitch axis of the gimbal, the vehicle body of the UAV can be controlled to rotate only around the roll axis of the UAV or to rotate only around the pitch axis of the UAV. The specific control method can be selected by a person skilled in the art and is not intended to limit herein.

Another implementation manner is that the attitude parameters of the UAV can be adjusted according to the attitude parameters of the gimbal, such that landing gears of the UAV are outside the photographing range of the photographing device provided at the gimbal.

Figure 2B:
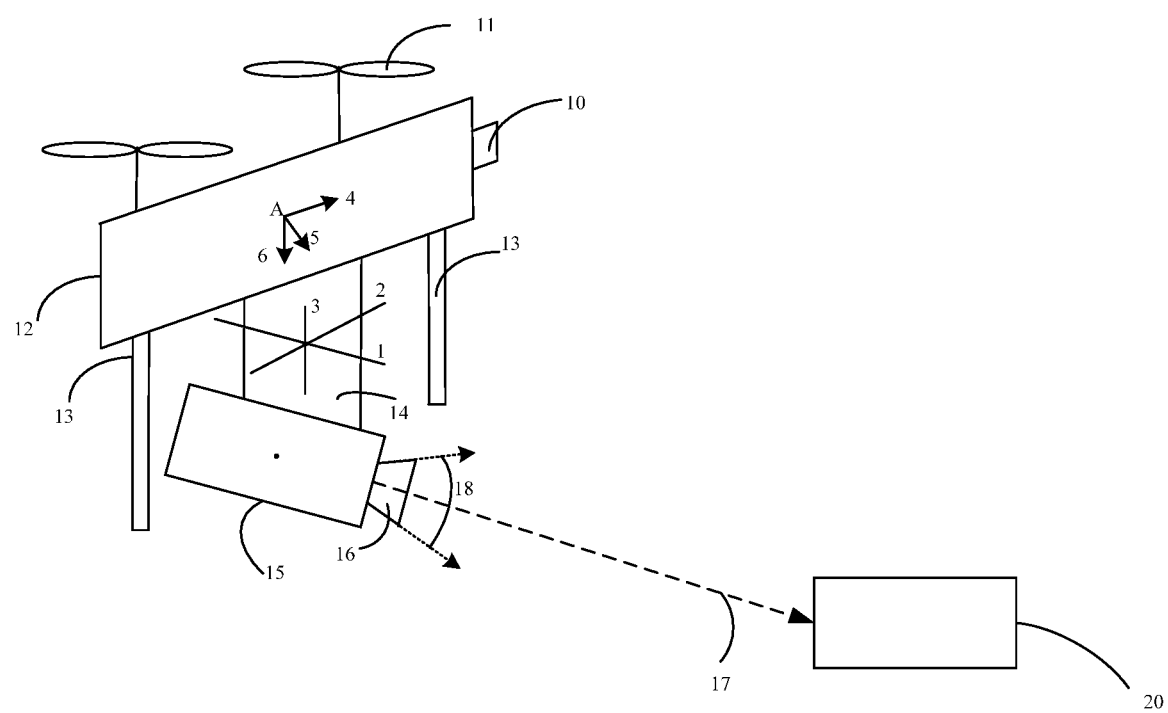
FIG. 2B schematically shows controlling the UAV to rotate around a yaw axis to move landing gears of the UAV out of a photographing range of a photographing device provided at the gimbal.

In some embodiments, as shown in FIG. 2A, the UAV is provided with the landing gears 13. When the UAV lands, the landing gears 13 can act as a buffer to allow the UAV to land safely. The length of the landing gears 13 can be greater than a distance of the photographing device 15 from a bottom of the vehicle body 12 of the UAV to prevent the gimbal 14 and/or the photographing device 15 from touching the ground and being damaged. Because the landing gears 13 of the UAV can be fixed, when the UAV is performing an aerial photography and the gimbal 14 is rotating around the one or more of the roll axis 1, the pitch axis 2, and the yaw axis 3 of the gimbal 14, the landing gears 13 can be within the photographing range 18 of the photographing device 15, such that the photographing device 15 can shoot the landing gears 13, as shown in FIG. 2A. Therefore, the flight controller can adjust the yaw parameters of the UAV, according to the yaw parameters of the gimbal 14. For example, when the gimbal 14 is rotated around the yaw axis 3 of the gimbal, the flight controller can control the UAV to also rotate with the yaw axis of the UAV and the landing gears 13 can rotate as the UAV rotates, such that the landing gears 13 of the UAV can be moved out of the photographing range 18 of the photographing device 15, and the photographing device 15 can be prevented from photographing the landing gears 13. FIG. 2B schematically shows controlling the UAV to rotate around the yaw axis 3 to move the landing gears 13 of the UAV out of the photographing range 18 of the photographing device 15 provided at the gimbal 14. As shown in FIG. 2B, the flight controller controls the UAV to rotate around the Z axis of the vehicle body coordinate system (denoted by arrow 6), i.e., the yaw axis is the rotation axis. As shown in FIGS. 2A and 2B, the attitudes of the gimbal 14 and the photographing device 15 remain unchanged, when the UAV rotates around the Z axis 6 of the vehicle body coordinate system, the landing gears 13 rotates along with the vehicle body of the UAV and rotates out of the photographing range 18 of the photographing device 15.

Figure 2C:
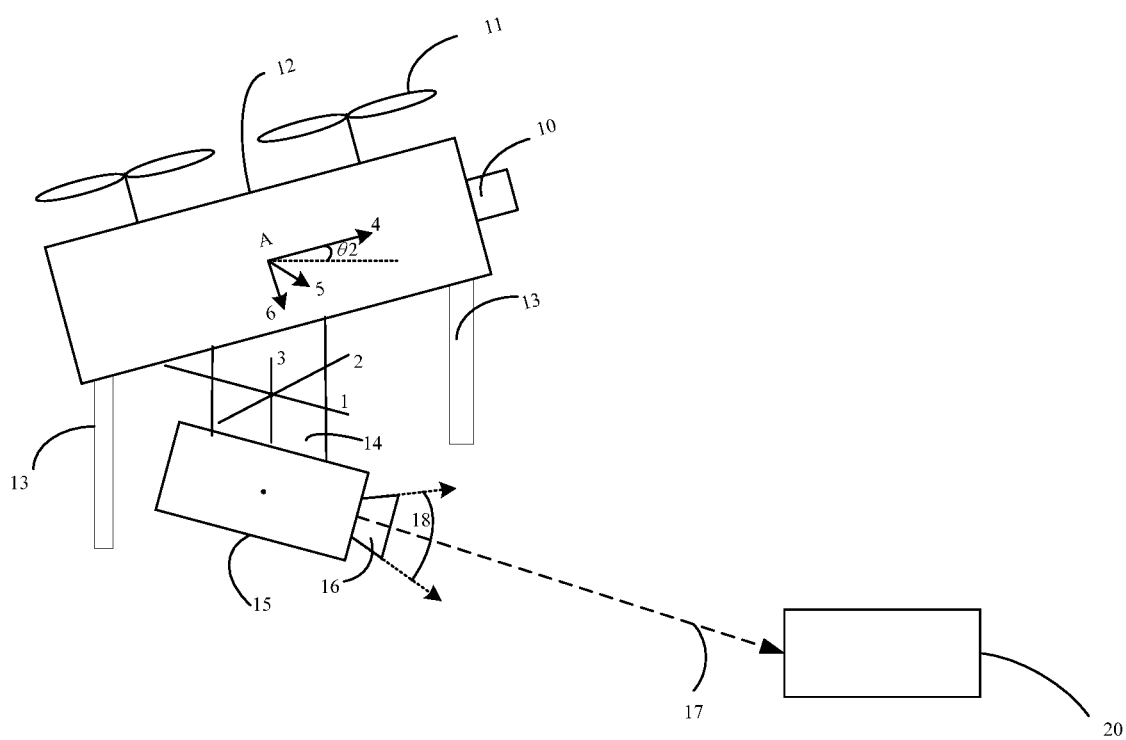
FIG. 2C schematically shows adjusting a pitch angle of the UAV according to a pitch angle of the gimbal to move the landing gears of the UAV out of the photographing range of the photographing device provided at the gimbal.

As another example, when the gimbal rotates around the pitch axis 2 of the gimbal 14, the flight controller can control the UAV to also rotate around the pitch axis 2 of UAV, such that the landing gears 13 rotates along with the UAV and the photographing device 15 can be prevented from photographing the landing gears 13. As shown in FIG. 2A, if the pitch angle of the gimbal is θ1, the landing gears 13 are within the photographing range 18 of the photographing device 15. In this situation, the flight controller can also adjust the pitch angle of the UAV based on the pitch angle of the gimbal θ1. FIG. 2C schematically shows adjusting the pitch angle of the UAV according to the pitch angle of the gimbal 14 to move the landing gears 13 of the UAV out of the photographing range 18 of the photographing device 15 provided at the gimbal 14. As shown in FIG. 2C, according to the pitch angle of the gimbal θ1, the pitch angle of the UAV is controlled to be θ2. When the UAV is controlled to raise the nose, the landing gears 13 of the UAV are raised along with the nose of the UAV, such that the landing gears 13 are outside the photographing range 18 of the photographing device 15 and the photographing device 15 is prevented from photographing the landing gears 13. In some embodiments, the flight controller can also control the UAV to rotate in the pitch direction, according to the angular velocity of the gimbal rotating around the pitch axis, such that the landing gears 13 can be outside the photographing range 18 of the photographing device 15.

In addition, according to the attitude parameters of the gimbal, the yaw parameters and the pitch parameters of the UAV can be adjusted at the same time, such that the landing gears can be outside the photographing range of the photographing device.

Therefore, in a photographing process, the UAV can automatically adjust the attitude parameters of the UAV according to the attitude parameters of the gimbal, thereby ensuring the landing gears of the UAV to be outside the photographing screen. The user does not need to manually adjust the attitude of the UAV, such that the operation process can be simplified and the professional requirements for the user can be reduced.

Another implementation manner is that the attitude parameters of the UAV are adjusted according to the attitude parameters of the gimbal, such that there is no stop position when the gimbal is rotating.

Figure 3:
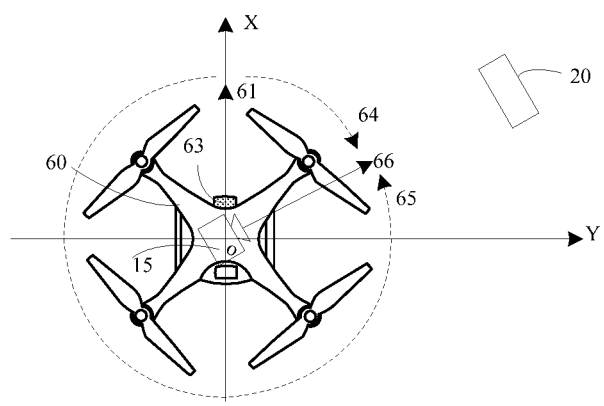
FIG. 3 schematically shows adjusting attitude parameters of a UAV according to attitude parameters of a gimbal, such that the gimbal is rotating without stop position.

FIG. 3 schematically shows adjusting the attitude parameters of a UAV 60 according to the attitude parameters of the gimbal, such that the gimbal is rotating without stop position. In the example shown in FIG. 3, a four-rotor UAV is depicted as an example of the UAV 60. The nose of the UAV 60 is denoted as 63, a current orientation of the nose 63 is denoted as 61, and a photographing device carried by the UAV 60 is denoted as 15. The photographing device 15 is provided at the UAV 60 via a gimbal (not shown). Further, a current photographing direction of the photographing device 15 is denoted as 66, the photographed target object is denoted as 20, and the photographing device 15 follows the photographed target object 20.

It is not intended to limit a position of the photographing device 15 with respect to the vehicle body of the UAV 60. The photographing device 15 can be provided at an upper side of the UAV 60 or can be provided at a bottom side of the UAV 60.

As shown in FIG. 3, a center of the vehicle body of the UAV 60 is denoted as o. The X axis of a vehicle body coordinate system corresponding to the UAV 60 passes through the center o and points to the nose 63 of the UAV 60. The Y axis of the vehicle body coordinate system passes through the center o and points to a right side of the vehicle body of the UAV 60. The Z axis (not shown) of the vehicle body coordinate system passes through the center o and points to a bottom side of the vehicle body of the UAV 60. The X-axis, Y-axis, and Z-axis of the vehicle body coordinate system follow the right-hand rule. The X axis of the vehicle body coordinate system is the roll axis of the UAV 60, the Y axis of the vehicle body coordinate system is the pitch axis of the UAV 60, and the Z axis of the vehicle body coordinate system is the yaw axis of the UAV 60.

Because the photographing device and the gimbal are connected via a transmission wire, the gimbal cannot rotate indefinitely around the one or more of the roll axis, the pitch axis, and the yaw axis of the gimbal. That is, when the gimbal rotates around the roll axis, the gimbal has a stop angle of the gimbal rotating around the roll axis, when the gimbal rotates around the pitch axis, the gimbal has a stop angle of the gimbal rotating around the pitch axis, and when the gimbal rotates around the yaw axis, the gimbal has a stop angle of the gimbal rotating around the yaw axis. Taking the stop angle of the gimbal rotating around the yaw axis as an example, the stop angle of the gimbal with the yaw axis is referred to as a stop angle of the yaw axis of the gimbal.

The stop angle of the yaw axis of the gimbal refers to, when the gimbal rotates around the yaw axis, a maximum angle at which the gimbal can rotate relative to the nose in the yaw direction. In some embodiments, the stop angle of the yaw axis can be +360° or −360°. That is, the photographing direction of the photographing device 15 provided at the gimbal can only be rotated counterclockwise 360° or clockwise 360° around the yaw axis of the gimbal in the yaw direction. Assume a negative direction refers to rotating counterclockwise from a positive direction of the X axis and a positive direction refers to rotating clockwise from the positive direction of the X axis. The photographing direction of the photographing device 15 can be rotated from the positive direction of the X-axis, i.e., a 0° direction, counterclockwise back to the positive direction of the X-axis, i.e., −360° or can be rotated from the positive direction of the X-axis, i.e., the 0° direction, clockwise back to the positive direction of the X-axis, i.e., +360°.

In some embodiments, when the gimbal rotates around the yaw axis of the gimbal and drives the photographing direction of the photographing device 15 to be rotated from the positive direction of the X axis, that is, the 0° direction, in the clockwise direction as shown by an arc 64, the flight controller can obtain the yaw parameters of the gimbal in real time, or the gimbal can send the yaw parameters to the flight controller in real time. The yaw parameters can include at least one of the yaw angle or the yaw rotation speed. The flight controller can control the UAV 60 to also rotate in the clockwise direction as shown by the arc 64, according to the yaw parameters, such that the stop angle of +360° can be avoid when the gimbal rotates around the yaw axis.

Similarly, when the gimbal rotates around the yaw axis of the gimbal and drives the photographing direction of the photographing device 15 to rotate from the positive direction of the X axis, that is, the 0° direction, in the counterclockwise direction as shown by an arc 65, the flight controller can obtain the yaw parameters of the gimbal in real time, or the gimbal can send the yaw parameters to the flight controller in real time. The yaw parameters can include at least one of the yaw angle or the yaw rotation speed. The flight controller can control the UAV 60 to also rotate in the counterclockwise direction as shown by the arc 65, according to the yaw parameters, such that the stop angle of −360° can be avoid when the gimbal rotates around the yaw axis.

According to the disclosure, the attitude parameters of the gimbal provided at the UAV can be obtained and the attitude parameters of the UAV can be adjusted according to the attitude parameters of the gimbal, such that there is no stop position when the gimbal is rotating in one or more of the yaw direction, the pitch direction, and the roll direction of the gimbal. In addition, the attitude parameters of the UAV can be adjusted according to the attitude parameters of the gimbal, thereby ensuring the landing gears of the UAV to be outside the photographing screen. The user does not need to manually adjust the attitude of the UAV, such that the operation process can be simplified and the professional requirements for the user can be reduced.

Figure 4:
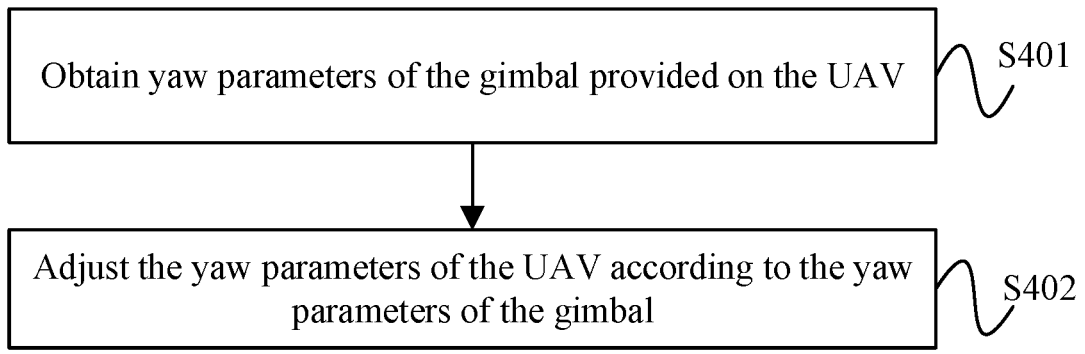
FIG. 4 is a flow chart of another control method according to the disclosure.

FIG. 4 is a flow chart of another example control method consistent with the disclosure. As shown in FIG. 4, at S401, the yaw parameters of the gimbal provided at the UAV are obtained.

In some embodiments, a ground control terminal, for example, a remote controller, can be configured to adjust the yaw parameters of the gimbal. For example, when the user manipulates a yaw lever or a yaw button of the control terminal, the control terminal can include the remote controller, and the remote controller can generate an amount of control lever displacement (also referred to as a "control amount") and send the amount of control lever displacement to the flight controller or a control circuit controlling the rotation of the gimbal. When the flight controller or the control circuit receives the amount of control lever displacement sent by the remote controller, the gimbal can be controlled to rotate around the yaw axis of the gimbal. When the control circuit controls the gimbal to rotate around the yaw axis of the gimbal, the control circuit can send the yaw parameters of the gimbal to the flight controller in real time. The yaw parameters can include the yaw angle of the gimbal or the yaw rotation speed of the gimbal.

In some embodiments, the photographing device can also perform tracking photography on a target object. In a course of tracking photography, the gimbal rotates in yaw direction. The flight controller or the control circuit controlling the rotation of the gimbal can obtain the yaw parameters of the gimbal in real time. The yaw parameter can include at least one of the yaw angle or the yaw rotation speed.

At S402, the yaw parameters of the UAV are adjusted according to the yaw parameters of the gimbal.

After the flight controller obtains the yaw parameters of the gimbal, the yaw parameters of the UAV can be adjusted according to the yaw parameters of the gimbal. The flight controller can control the UAV to rotate in the yaw direction according to the yaw parameters of the gimbal. That is, the UAV can be controlled to rotate around the yaw axis of the UAV, such that the UAV rotates along with the rotation of the gimbal in the yaw direction.

In some embodiments, when the UAV and the gimbal are rotating around their own yaw axis, respectively, the rotation direction of the UAV can be consistent with the rotation direction of the gimbal. The flight controller can adjust the yaw angle of the UAV according to the yaw angle of the gimbal, such that the yaw angle of the UAV can be consistent with the yaw angle of the gimbal. In some other embodiments, the flight controller can adjust the yaw rotation speed of the UAV according to the yaw rotation speed of the gimbal, such that the yaw rotation speed of the UAV can be consistent with the yaw rotation speed of the gimbal.

According to the disclosure, the yaw parameters of the gimbal provided at the UAV can be obtained, the yaw parameters of the UAV can be adjusted according to the yaw parameters of the gimbal, i.e., the yaw parameters of the UAV can change passively with the changes of the yaw parameters of the gimbal, such that the rotation of the gimbal in the yaw direction will not be limited by the yaw parameters of the UAV, and the gimbal can rotate in the yaw direction without stop position. Furthermore, compared to the situation that the yaw parameters of the gimbal are changed passively with the changes of the yaw parameters of the UAV, the overshoot of the gimbal in the yaw direction due to the inertia when the UAV stops rotating around the yaw axis of the vehicle body can be avoided, the stability of the photographing device provide on the gimbal can be ensured, and the stability of the photographed images of the photographing device can be improved.

Figure 5:
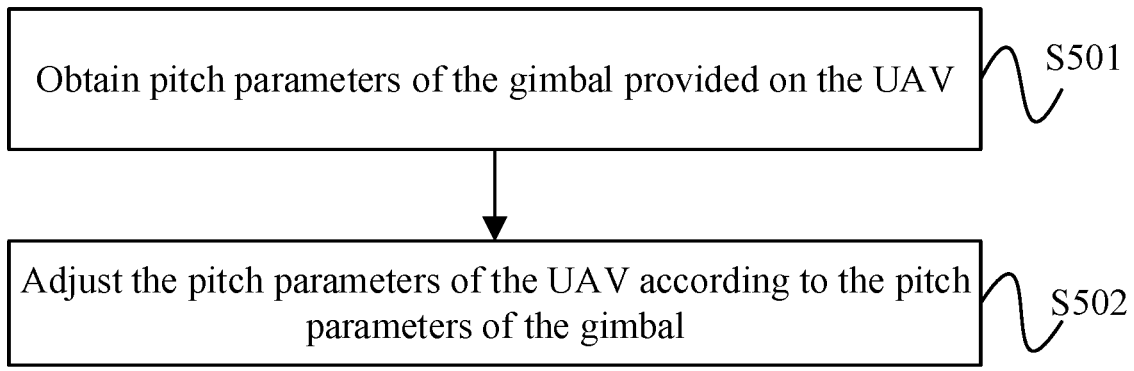
FIG. 5 is a flow chart of another control method according to the disclosure.

FIG. 5 is a flow chart of another example control method consistent with the disclosure. As shown in FIG. 5, at S501, the pitch parameters of the gimbal provided at the UAV are obtained.

In some embodiments, the ground control terminal, for example the remote controller, can be configured to adjust the pitch parameters of the gimbal. For example, when the user manipulates a pitch lever or a pitch button of the control terminal, the remote controller can generate an amount of control lever displacement (also referred to as a "control amount"), and send the amount of control lever displacement to the flight controller or the control circuit controlling the rotation of the gimbal. When the flight controller or the control circuit receives the amount of control lever displacement sent by the remote controller, the gimbal can be controlled to rotate around the yaw axis of the gimbal.

When the control unit controls the gimbal to rotate around the pitch axis of the gimbal, the control circuit can send the pitch parameters of the gimbal to the flight controller in real time. The pitch parameters can include the pitch angle of the gimbal or the pitch rotation speed of the gimbal.

Figure 6A:
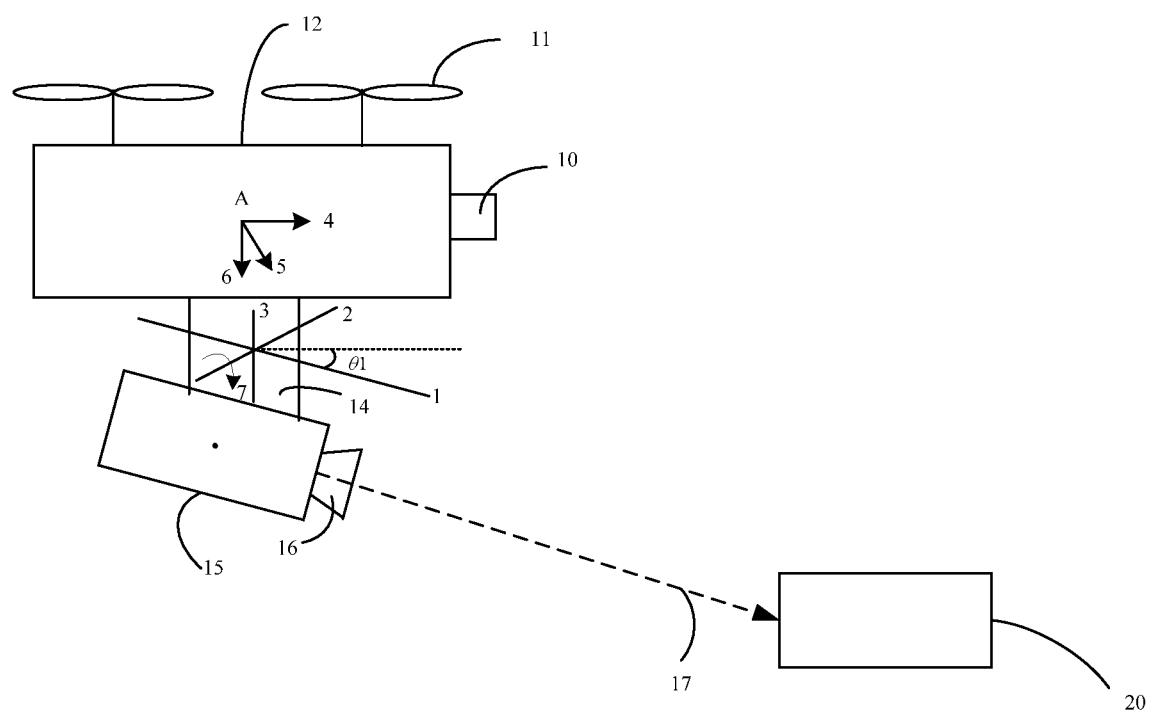
FIG. 6A schematically shows a gimbal rotating clockwise around a pitch axis of the gimbal.

In some other embodiments, the photographing device can also perform tracking photography on the target object. In the course of tracking photography, the gimbal rotates in the pitch direction. The flight controller or the control circuit controlling the rotation of the gimbal can obtain the pitch parameters of the gimbal in real time. The pitch parameter can include at least one of the pitch angle or the pitch rotation speed. FIG. 6A schematically shows the gimbal rotating clockwise around the pitch axis of the gimbal. As shown in FIG. 6A, the roll axis of the gimbal is denoted as 1, the pitch axis of the gimbal is denoted as 2, and the yaw axis of the gimbal is denoted as 3, a nose of the UAV is denoted as 10, one or more propellers are denoted as 11, a vehicle body of the UAV is denoted as 12, the gimbal provided at the UAV is denoted as 14, a photographing device carried by the UAV is denoted as 15 (the photographing device 15 is connected to the vehicle body 12 of the UAV via the gimbal 14), a photographing lens of the photographing device 15 is denoted as 16, an optical axis direction of the photographing lens 16 is denoted as 17, a photographed target object of the photographing lens 16 is denoted as 20, and the optical axis direction 17 points to the photographed target object 20 and denotes a photographing direction of the photographing device 15.

At S502, the pitch parameters of the UAV are adjusted according to the pitch parameters of the gimbal.

Figure 6B:
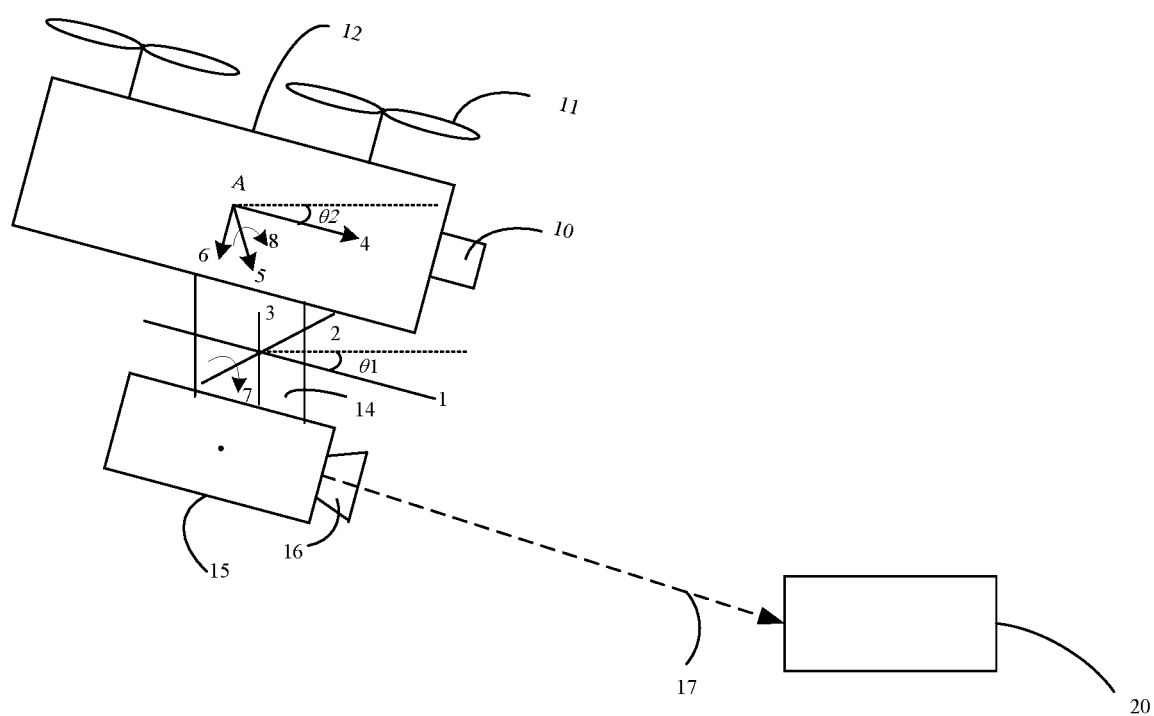
FIG. 6B schematically shows a UAV rotating clockwise around a pitch axis of the UAV.

When the flight controller obtains the pitch parameters of the gimbal, the pitch parameters of the UAV can be adjusted according to the pitch parameters of the gimbal. The flight controller controls the UAV to rotate in the pitch direction according to the pitch parameters of the gimbal. That is, the UAV can be controlled to rotate around the pitch axis of the UAV, such that the UAV rotates along with the rotation of the gimbal in the pitch direction. As shown in FIG. 6A, the gimbal rotates clockwise around the pitch axis of the gimbal, as shown by arrow 7. In some embodiments, the flight controller can control the UAV to rotate clockwise around the pitch axis of the UAV. FIG. 6B schematically shows the UAV rotating clockwise around the pitch axis of the UAV. The clockwise direction can be the direction of the arrow 8 as shown in FIG. 6B. As shown in FIG. 6B, when the UAV is controlled to rotate clockwise around the pitch axis of the UAV, the flight controller can adjust the pitch angle of the UAV 02 to follow the change of the pitch angle of the gimbal θ1, and the pitch angle of the UAV θ2 can be consistent with the pitch angle of the gimbal θ1, such that when the gimbal is rotating in the pitch direction, the stop position can be avoided. In some embodiments, the pitch angle of the UAV can be not consistent with the pitch angle of the gimbal. It is not intended to limit the control manner, and those skilled in the art can select the control manner according to actual requirements.

In some other embodiments, the flight controller can also adjust the pitch rotation speed of the UAV, according to the pitch rotation speed of the gimbal, such that the pitch rotation speed of the UAV can be consistent with the pitch rotation speed of the gimbal.

According to the disclosure, the pitch parameters of the gimbal provided at the UAV can be obtained, the pitch parameters of the UAV can be adjusted according to the pitch parameters of the gimbal, i.e., the pitch parameters of the UAV can change passively with the changes of the pitch parameters of the gimbal, such that the rotation of the gimbal in the pitch direction will not be limited by the pitch parameters of the UAV, and the gimbal can rotate in the pitch direction without stop position. Furthermore, compared to the situation that the pitch parameters of the gimbal are changed passively with the changes of the pitch parameters of the UAV, the overshoot of the gimbal in the pitch direction due to the inertia when the UAV stops rotating around the pitch axis of the vehicle body can be avoided, the stability of the photographing device provide on the gimbal can be ensured, and the stability of the photographed images of the photographing device can be improved.

Figure 7:
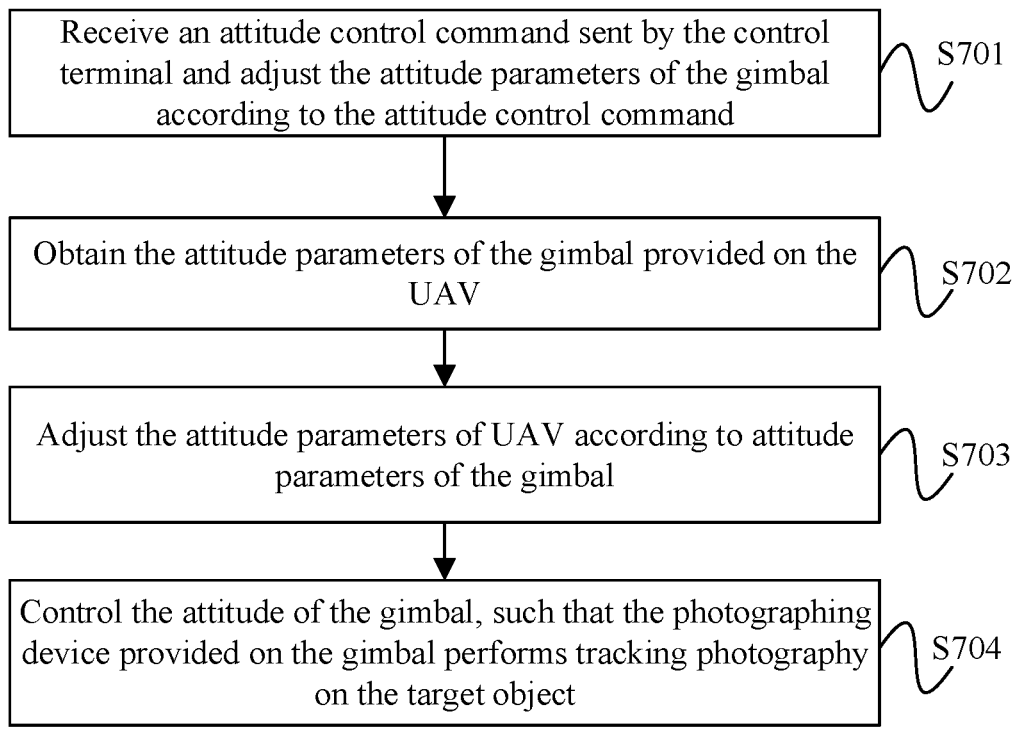
FIG. 7 is a flow chart of another control method according to the disclosure.

FIG. 7 is a flow chart of another example control method consistent with the disclosure. As shown in FIG. 7, at S701, an attitude control command sent by the control terminal is received and the attitude parameters of the gimbal are adjusted according to the attitude control command.

In some embodiments, the ground control terminal, such as the remote controller, can be configured to adjust the attitude parameters of the gimbal. The remote controller can send the attitude control command to the flight controller or the control circuit controlling the rotation of the gimbal. The attitude control command can be configured to adjust the attitude parameters of the gimbal. The attitude parameters of the gimbal can include one or more of the yaw parameters, the pitch parameters, and the roll parameters. When the flight controller or the control circuit controlling the rotation of the gimbal receives the attitude control command sent by the remote controller, the attitude parameters of the gimbal can be adjusted according to the attitude control command.

In some embodiments, the attitude control command can include at least one of a command for adjusting the angles of the attitude parameters of the gimbal or a command for adjusting the angular velocities of the attitude parameters of the gimbal.

The attitude control command sent by the control terminal to the flight controller or the control circuit controlling the rotation of the gimbal can be a pitch control command for adjusting the pitch parameters of the gimbal, a roll control command for adjusting the roll parameters of the gimbal, or a yaw control command for adjusting the yaw parameters of the gimbal. Accordingly, when the flight controller or the control circuit controlling the rotation of the gimbal receives the attitude control command sent by the remote controller, the flight controller or the control circuit controlling the rotation of the gimbal can adjust the attitude parameters of the gimbal according to the attitude control command in one of several manners, such as those described below.

An implementation manner is that the pitch control command sent by the control terminal is received to adjust the pitch parameters of the gimbal.

When the user manipulates the yaw lever or the yaw button of the remote controller, the remote controller generates the amount of control lever displacement that includes angle information for adjusting the pitch angle of the gimbal, or rotation speed information for adjusting the pitch rotation speed of the gimbal rotating around the pitch axis. The remote controller can send the amount of control lever displacement to the flight controller or the control circuit controlling the gimbal, the flight controller or the control circuit can adjust the pitch angle of the gimbal according to the angle information included in the amount of control lever displacement, or control the gimbal to rotate around the pitch axis of the gimbal, according to the pitch rotation speed included in the amount of control lever displacement.

Another implementation manner is that the roll control command sent by the control terminal is received to adjust the roll parameters of the gimbal.

When the user manipulates the roll lever or the roll button of the remote controller, the remote controller generates the amount of control lever displacement that includes angle information for adjusting the roll angle of the gimbal, or rotation speed information for adjusting the roll rotation speed of the gimbal rotating around the roll axis. The remote controller can send the amount of control lever displacement to the flight controller or the control circuit controlling the gimbal, the flight controller or the control circuit can adjust the roll angle of the gimbal according to the angle information included in the amount of control lever displacement, or control the gimbal to rotate around the roll axis of the gimbal, according to the roll rotation speed included in the amount of control lever displacement.

Another implementation manner is that a yaw control command sent by the control terminal is received to adjust the yaw parameters of the gimbal.

When the user manipulates the yaw lever or the yaw button of the remote controller, the remote controller generates the amount of control lever displacement that includes angle information for adjusting the yaw angle of the gimbal, or rotation speed information for adjusting the yaw rotation speed of the gimbal rotating around the yaw axis. The remote controller can send the amount of control lever displacement to the flight controller or the control circuit controlling the gimbal, the flight controller or the control circuit can adjust the yaw angle of the gimbal according to the angle information included in the amount of control lever displacement, or control the gimbal to rotate around the yaw axis of the gimbal, according to the yaw rotation speed included in the amount of control lever displacement.

In some other embodiments, the remote controller has two operation modes. An operation mode is to adjust the attitude parameters of the gimbal, such as the pitch parameters, the roll parameters, and the yaw parameters of the gimbal. Another operation mode is to adjust the attitude parameters of the UAV, such as the pitch parameters, the roll parameters, and the yaw parameters of the UAV. In some embodiments, the remote controller can be provided with a mode switching button or key, and the user can change the operation mode of the remote controller by pressing the mode switching button or key.

For example, the current operation mode of the remote controller is to adjust the attitude parameters of the gimbal. When the user manipulates the yaw lever or the yaw button of the remote controller, the remote controller can generate the amount of control lever displacement, and send the amount of control lever displacement to the flight controller, and the flight controller can adjust the yaw parameters of the gimbal according to the amount of control lever displacement. If the user presses the mode switching button or key, the operation mode of the remote controller can be switched to controlling the attitude parameters of the UAV. When the user manipulates the yaw lever or the yaw button of the remote controller, the remote controller can generate the amount of control lever displacement and send the amount of control lever displacement to the flight controller, and the flight controller can adjust the yaw parameters of the UAV according to the amount of control lever displacement. When the user manipulates the pitch lever or the pitch button of the remote controller, the remote controller can generate the amount of control lever displacement and send the amount of control lever displacement to the flight controller, and the flight controller can adjust the pitch parameters of the UAV according to the amount of control lever displacement. When the user manipulates the roll lever or the roll button of the remote controller, the remote controller can generate the amount of control lever displacement and send the amount of control lever displacement to the flight controller, and the flight controller can adjust the roll parameters of the UAV according to the amount of control lever displacement.

At S702, the attitude parameters of the gimbal provided at the UAV are obtained.

The process at S702 is the same as the process at S101, and the details thereof are omitted herein.

At S703, the attitude parameters of UAV are adjusted according to attitude parameters of the gimbal.

The process at S703 is the same as the process at S102, and the details thereof are omitted herein.

At S704, the attitude of the gimbal is controlled, such that the photographing device provided at the gimbal performs tracking photography on the target object.

In some embodiments, the flight controller can also control the gimbal of the UAV, such that the photographing device provided at the gimbal can always be aimed at the target object, i.e., the tracking photography can be performed on the target object. When the target object moves, the flight controller adjusts the gimbal, such that the photographing device can rotate and keep the target object on the photographing screen. The gimbal can send its attitude parameters to the flight controller and the flight controller can control the attitude of the UAV based on the attitude parameters of the gimbal. As such, the UAV can automatically adjust its attitude, such that the landing gears of the UAV can be outside the photographing screen and the gimbal can rotate without stop position. The user does not need to manually adjust the attitude of the UAV, such that the operation process can be simplified and the professional requirements for the user can be reduced.

According to the disclosure, the ground control terminal can send the attitude control command to the UAV, and the flight controller in the UAV or the control circuit controlling the rotation of the gimbal can adjust the attitude parameters of the gimbal according to the attitude control command, such that the control terminal can directly adjust the attitude parameters of the gimbal (for example, one or more of the yaw parameters, the pitch parameters and the roll parameters), and the control methods of the gimbal are enriched. Furthermore, the lag in the attitude adjustment of the gimbal relative to the attitude adjustment of the vehicle body of the UAV can be avoided, and the phenomenon that the image shoot by the photographing device appears to be "not following the hands" can also be avoided. In addition, the attitude of the gimbal will no longer change along with the change of the attitude of the vehicle body of the UAV, the problem of overshoot that the gimbal may generate under inertia can be avoided, such that the gimbal can rotate and stop more smoothly, the stability of the photographing device provided at the gimbal can be ensured, and the stability of the photographing screen of the photographing device can be improved.

Figure 8:
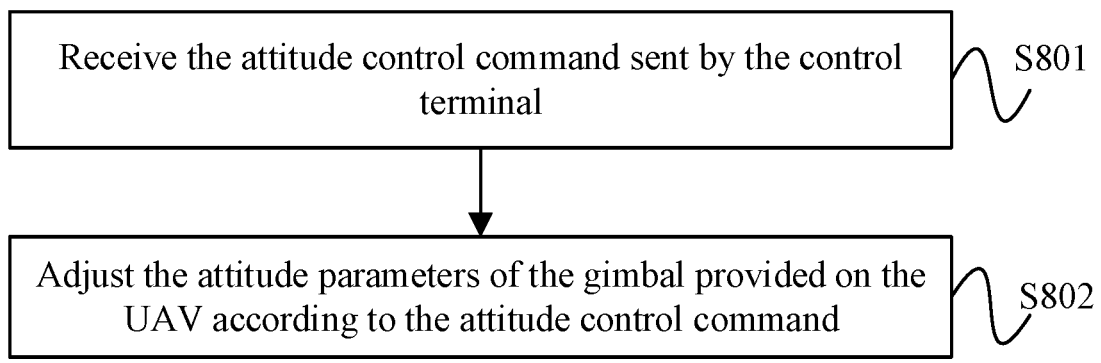
FIG. 8 is a flow chart of another control method according to the disclosure.

FIG. 8 is a flow chart of another example control method consistent with the disclosure. As shown in FIG. 8, at S801, the attitude control command sent by the control terminal is received.

The attitude control command includes at least one of the command for adjusting the angles of the attitude parameters of the gimbal or the command for adjusting the angular velocities of the attitude parameters of the gimbal.

At S802, the attitude parameters of the gimbal provided at the UAV are adjusted according to the attitude control command.

The attitude parameters can include at least one of the yaw parameters or the roll parameters.

In some embodiments, the attitude parameters can also include the pitch parameters.

The yaw parameters can include at least one of the yaw angle or the yaw rotation speed.

The pitch parameters can include at least one of the pitch angle or the pitch rotation speed.

The roll parameters can include at least one of the roll angle or the roll rotation speed.

In some embodiments, receiving the attitude control command sent by the control terminal, and adjusting the attitude parameters of the gimbal provided at the UAV according to the attitude control command, can include at least one of the followings: receiving the pitch control command sent by the control terminal to adjust the pitch parameters of the gimbal; receiving the roll control command sent by the control terminal to adjust the roll parameters of the gimbal; or receiving the yaw control command sent by the control terminal to adjust the yaw parameters of the gimbal.

The pitch control command can include the amount of control lever displacement generated by manipulating the pitch lever or the pitch button of the control terminal. The roll control command can include the amount of control lever displacement generated by manipulating the roll lever or the roll button of the control terminal. The yaw control command can include the amount of control lever displacement generated by manipulating the yaw lever or the yaw button of the control terminal.

The principles and implementation manners of the control method provided in FIG. 8 are similar to those of the method shown in FIG. 7, and details thereof are omitted herein.

According to the disclosure, the ground control terminal can send the attitude control command to the UAV, and the flight controller in the UAV or the control circuit controlling the rotation of the gimbal can adjust the attitude parameters of the gimbal according to the attitude control command, such that the control terminal can directly adjust the attitude parameters of the gimbal (for example, one or more of the yaw parameters, the pitch parameters and the roll parameters), and the control method of the gimbal are enriched. Furthermore, the lag in the attitude adjustment of the gimbal relative to the attitude adjustment of the vehicle body of the UAV can be avoided, and the phenomenon that the image shoot by the photographing device appears to be "not following the hands" can also be avoided. In addition, the attitude of the gimbal will no longer change along with the change of the attitude of the vehicle body of the UAV, the problem of overshoot that the gimbal may generate under inertia can be avoided, such that the gimbal can rotate and stop more smoothly, the stability of the photographing device provided at the gimbal can be ensured, and the stability of the photographing screen of the photographing device can be improved.

Figure 9:
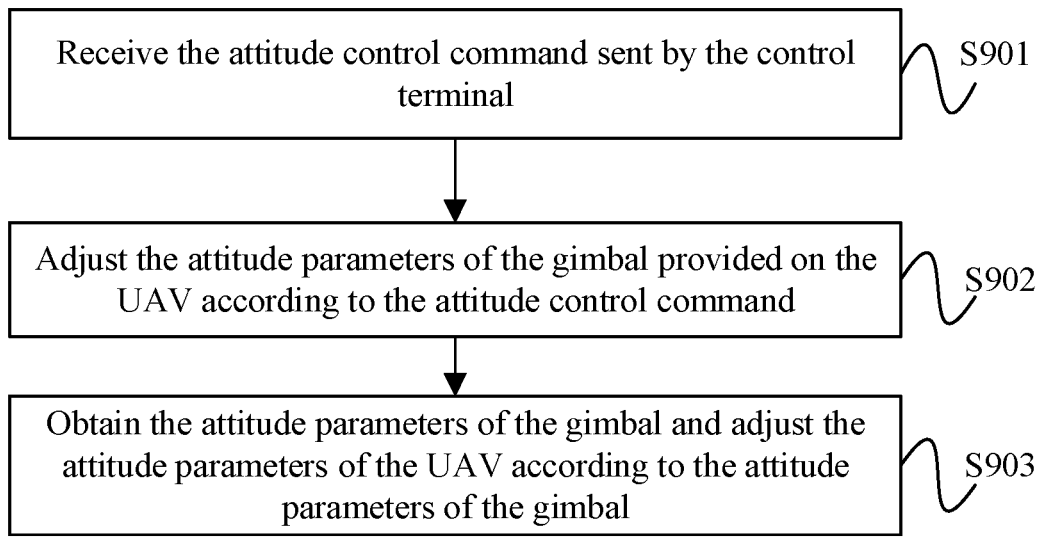
FIG. 9 is a flow chart of another control method according to the disclosure.

FIG. 9 is a flow chart of another example control method consistent with the disclosure. As shown in FIG. 9, at S901, the attitude control command sent by the control terminal is received.

At S902, the attitude parameters of the gimbal provided at the UAV are adjusted according to the attitude control command.

At S903, the attitude parameters of the gimbal are obtained and the attitude parameters of the UAV are adjusted according to the attitude parameters of the gimbal.

One or more of the yaw parameters, the pitch parameters and the roll parameters of the UAV are adjusted according to one or more of the yaw parameters, the pitch parameters and the roll parameters of the gimbal.

In some embodiments, the attitude parameters of the UAV can be adjusted according to the attitude parameters of the gimbal, such that the landing gears of the UAV can be outside the photographing range of the photographing device provided at the gimbal.

In some other embodiments, the attitude parameters of the UAV can also be adjusted according to the attitude parameters of the gimbal, such that the gimbal can rotate without stop position.

According to the disclosure, the attitude parameters of the gimbal provided at the UAV can be obtained and the attitude parameters of the UAV can be adjusted according to the attitude parameters of the gimbal, such that there is no stop position when the gimbal is rotating in one or more of the yaw direction, the pitch direction, and the roll direction of the gimbal. In addition, the attitude parameters of the UAV can be adjusted according to the attitude parameters of the gimbal, thereby ensuring the landing gears of the UAV to be outside the photographing screen. The user does not need to manually adjust the attitude of the UAV, such that the operation process can be simplified and the professional requirements for the user can be reduced.

In some embodiments, obtaining the attitude parameters of the gimbal can include obtaining the yaw parameters of the gimbal; accordingly, adjusting the attitude parameters of the UAV according to the attitude parameters of the gimbal can include adjusting the yaw parameters of the UAV according to the yaw parameters of the gimbal. According to the yaw parameters of the gimbal, the rotation of the UAV in the yaw direction can be controlled, such that the UAV can follow the rotation of the gimbal. In some embodiments, the yaw angle of the UAV can be adjusted according to the yaw angle of the gimbal, such that the yaw angle of the UAV can be consistent with the yaw angle of the gimbal.

The principles and implementation manners of the control method provided in FIG. 9 are similar to those of the methods shown in FIGS. 1 and 4, and details thereof are omitted herein.

According to the disclosure, the yaw parameters of the gimbal provided at the UAV can be obtained and the yaw parameters of the UAV can be adjusted according to the yaw parameters of the gimbal, i.e., the yaw parameters of the UAV can be changed as the yaw parameters of the gimbal changes, such that the rotation of the gimbal in the yaw direction will not be limited by the yaw parameters of the UAV, and the gimbal can rotate in the yaw direction without stop position. Furthermore, compared to the situation that the yaw parameters of the gimbal are changed passively with the changes of the yaw parameters of the UAV, the overshoot of the gimbal in the yaw direction due to the inertia when the UAV stops rotating around the yaw axis of the vehicle body can be avoided, the stability of the photographing device provide on the gimbal can be ensured, and the stability of the photographed images of the photographing device can be improved.

An example computer storage medium consistent with the disclosure can be configured to store program instructions. When the program is executed, some or all processes of the control methods shown in FIG. 1-7 or 8-9 can be implemented.

Figure 10:
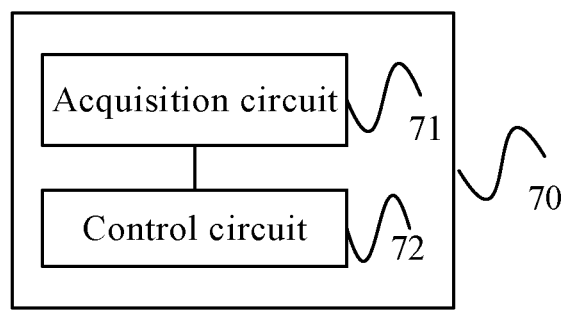
FIG. 10 is a structural diagram of a control apparatus according to the disclosure.

FIG. 10 is a structural diagram of an example control apparatus 70 consistent with the disclosure. As shown in FIG. 10, the control apparatus 70 includes an acquisition circuit 71 and a control circuit 72. The acquisition circuit 71 is configured to obtain attitude parameters of a gimbal provided at a UAV. The control circuit 72 is configured to adjust attitude parameters of the UAV according to the attitude parameters of the gimbal. The attitude parameters can include one or more of yaw parameters, pitch parameters, and roll parameters.

In some embodiments, the control circuit 72 can be configured to adjust the one or more of the yaw parameters, the pitch parameters, and the roll parameters of the UAV, according to the one or more of the yaw parameters, the pitch parameters, and the roll parameters of the gimbal.

In some embodiments, the control circuit 72 can be configured to adjust the attitude parameters of the UAV according to the attitude parameters of the gimbal, such that landing gears of the UAV are outside the photographing range of the photographing device provided at the gimbal.

In some other embodiments, the control circuit 72 can be configured to adjust the attitude parameters of the UAV according to the attitude parameters of the gimbal, such that there is no stop position when the gimbal is rotating.

The principles and implementation manners of the control apparatus provided in FIG. 10 are similar to those of the control method shown in FIG. 1, and details thereof are omitted herein.

According to the disclosure, the control apparatus can obtain the attitude parameters of the gimbal provided at the UAV and adjust the attitude parameters of the UAV according to the attitude parameters of the gimbal, i.e., the attitude parameters of the UAV can change passively with the change of the attitude parameters of the gimbal, such that the gimbal control methods can be more simple and direct, the control methods of the gimbal can be enriched, and the flexibility of gimbal control methods can be improved. Furthermore, the lag in the attitude adjustment of the gimbal relative to the attitude adjustment of the vehicle body of the UAV can be avoided, and when the attitude of the gimbal changes along with the change of the attitude of the vehicle body of the UAV, the problem of overshoot that the gimbal may generate under inertia can be avoided, such that the gimbal can rotate and stop more smoothly, the stability of the photographing device provided at the gimbal can be ensured, and the stability of the photographing screen of the photographing device can be improved.

In some embodiments, the acquisition circuit 71 can be configured to obtain the yaw parameters of the gimbal provided at the UAV. The control circuit 72 can be configured to adjust the yaw parameters of the UAV according to the yaw parameters of the gimbal. In some embodiments, the rotation of the UAV in the yaw direction can be controlled according to the yaw parameters of the gimbal, such that the UAV can rotate along with the rotation of the gimbal. The yaw parameters can include at least one of the yaw angle or the yaw rotation speed. The control circuit 72 can be configured to adjust the yaw angle of the UAV according to the yaw angle of the gimbal, such that the yaw angle of the UAV can be consistent with the yaw angle of the gimbal.

The principles and implementation manners of the control apparatus described above are similar to those of the control method shown in FIG. 4, and details thereof are omitted herein.

According to the disclosure, the control apparatus can obtain the yaw parameters of the gimbal provided at the UAV and adjust the yaw parameters of the UAV according to the yaw parameters of the gimbal, i.e., the yaw parameters of the UAV can change passively with the change of the yaw parameters of the gimbal, such that the rotation of the gimbal in the yaw direction will not be limited by the yaw parameters of the UAV, and the gimbal can rotate in the yaw direction without stop position. Furthermore, compared to the situation that the yaw parameters of the gimbal are changed passively with the changes of the yaw parameters of the UAV, the overshoot of the gimbal in the yaw direction due to the inertia when the UAV stops rotating around the yaw axis of the vehicle body can be avoided, such that the gimbal can rotate and stop more smoothly, the stability of the photographing device provided at the gimbal can be ensured, and the stability of the photographing screen of the photographing device can be improved.

In some embodiments, the acquisition circuit 71 can be configured to obtain the pitch parameters of the gimbal provided at the UAV, and the control circuit 72 can be configured to adjust the pitch parameters of the UAV according to the pitch parameters of the gimbal. The pitch parameters can include at least one of the pitch angle or the pitch rotation speed.

The principles and implementation manners of the control apparatus described above are similar to those of the control method shown in FIG. 5, and details thereof are omitted herein.

According to the disclosure, the control apparatus can obtain the pitch parameters of the gimbal provided at the UAV and adjust the pitch parameters of the UAV according to the pitch parameters of the gimbal, i.e., the pitch parameters of the UAV can change passively with the change of the pitch parameters of the gimbal, such that the rotation of the gimbal in the pitch direction will not be limited by the pitch parameters of the UAV, and the gimbal can rotate in the pitch direction without stop position. Furthermore, compared to the situation that the pitch parameters of the gimbal are changed passively with the changes of the pitch parameters of the UAV, the overshoot of the gimbal in the pitch direction due to the inertia when the UAV stops rotating around the pitch axis of the vehicle body can be avoided, such that the gimbal can rotate and stop more smoothly, the stability of the photographing device provided at the gimbal can be ensured, and the stability of the photographing screen of the photographing device can be improved.

Figure 11:
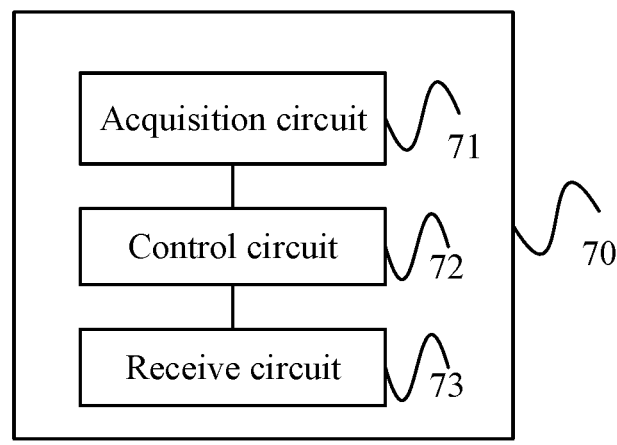
FIG. 11 is a structural diagram of another control apparatus according to the disclosure.

FIG. 11 is a structural diagram of another example control apparatus 70 consistent with the disclosure. As shown in FIG. 11, the control apparatus 70 further includes a receive circuit 73. The receive circuit 73 is configured to receive an attitude control command sent by the control terminal and the control circuit 72 is further configured to adjust the attitude parameters of the gimbal according to the attitude control command. The attitude control command can include at least one of a command for adjusting the angles of the attitude parameters of the gimbal or a command for adjusting the angular velocities of the attitude parameters of the gimbal.

In some embodiments, the receive circuit 73 can be configured to receive at least one of a pitch control command, a roll control command, or a yaw control command sent by the control terminal. Accordingly, the control circuit 72 can be configured to perform at least one of the following processes: adjusting the pitch parameters of the gimbal according to the pitch control command sent by the control terminal, adjusting the roll parameters of the gimbal according to the roll control command sent by the control terminal, or adjusting the yaw parameters of the gimbal according to the yaw control command sent by the control terminal.

In some embodiments, the pitch control command can include the amount of control lever displacement generated by manipulating the pitch lever or the pitch button of the control terminal. The roll control command can include the amount of control lever displacement generated by manipulating the roll lever or the roll button of the control terminal. The yaw control command can include the amount of control lever displacement generated by manipulating the yaw lever or the yaw button of the control terminal.

In some embodiments, the control circuit 72 can further be configured to control the attitude of the gimbal, such that the photographing device provided at the gimbal can perform tracking photography on the target object.

The principles and implementation manners of the control apparatus in FIG. 11 are similar to those of the control method shown in FIG. 7, and details thereof are omitted herein.

According to the disclosure, the control apparatus can obtain the attitude control command sent by the ground control terminal and adjust the attitude parameters of the gimbal according to the attitude control command, such that the control terminal can directly adjust the attitude parameters of the gimbal (for example, one or more of the yaw parameters, the pitch parameters and the roll parameters), and the control methods of the gimbal can be enriched. Furthermore, the lag in the attitude adjustment of the gimbal relative to the attitude adjustment of the vehicle body of the UAV can be avoided, and the phenomenon that the image shoot by the photographing device appears to be "not following the hands" can also be avoided. In addition, the attitude of the gimbal will no longer change along with the change of the attitude of the vehicle body of the UAV, the problem of overshoot that the gimbal may generate under inertia can be avoided, such that the gimbal can rotate and stop more smoothly, the stability of the photographing device provided at the gimbal can be ensured, and the stability of the photographing screen of the photographing device can be improved.

Figure 12:
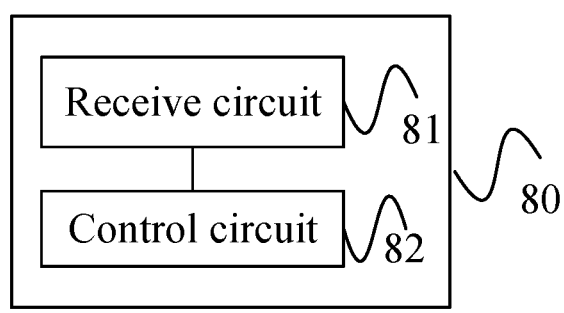
FIG. 12 is a structural diagram of another control apparatus according to the disclosure.

FIG. 12 is a structural diagram of another example control apparatus 80 according to the disclosure. As shown in FIG. 12, the control apparatus 80 includes a receive circuit 81 and a control circuit 82. The receive circuit 81 is configured to receive the attitude control command sent by the control terminal. The control circuit 82 is configured to adjust the attitude parameters of the gimbal provided at the UAV according to the attitude control command. The attitude parameters can include at least one of the yaw parameters and the roll parameters. In some embodiments, the attitude parameters can also include the pitch parameters. In some embodiments, the yaw parameters can include at least one of the yaw angle and the yaw rotation speed. The pitch parameters can include at least one of the pitch angle and the pitch rotation speed. The roll parameters can include at least one of the roll angle and the roll rotation speed. The attitude control command includes at least one of the command for adjusting the angles of the attitude parameters of the gimbal or the command for adjusting the angular velocities of the attitude parameters of the gimbal.

The receive circuit 81 can be configured to receiving at least one of the pitch control command, the roll control command, and the yaw control command sent by the control terminal. Accordingly, the control circuit 82 can be configured to perform at least one of the following processes: adjusting the pitch parameters of the gimbal according to the pitch control command sent by the control terminal, adjusting the roll parameters of the gimbal according to the roll control command sent by the control terminal, or adjusting the yaw parameters of the gimbal according to the yaw control command sent by the control terminal. The pitch control command can include the amount of control lever displacement generated by manipulating the pitch lever or the pitch button of the control terminal. The roll control command can include the amount of control lever displacement generated by manipulating the roll lever or the roll button of the control terminal. The yaw control command can include the amount of control lever displacement generated by manipulating the yaw lever or the yaw button of the control terminal.

The principles and implementation manners of the control apparatus in FIG. 12 are similar to those of the control method shown in FIG. 8, and details thereof are omitted herein.

According to the disclosure, the control apparatus can obtain the attitude control command sent by the ground control terminal and adjust the attitude parameters of the gimbal according to the attitude control command, such that the control terminal can directly adjust the attitude parameters of the gimbal (for example, one or more of the yaw parameters, the pitch parameters and the roll parameters), and the control methods of the gimbal can be enriched. Furthermore, the lag in the attitude adjustment of the gimbal relative to the attitude adjustment of the vehicle body of the UAV can be avoided, and the phenomenon that the image shoot by the photographing device appears to be "not following the hands" can also be avoided. In addition, the attitude of the gimbal will no longer change along with the change of the attitude of the vehicle body of the UAV, the problem of overshoot that the gimbal may generate under inertia can be avoided, such that the gimbal can rotate and stop more smoothly, the stability of the photographing device provided at the gimbal can be ensured, and the stability of the photographing screen of the photographing device can be improved.

Figure 13:
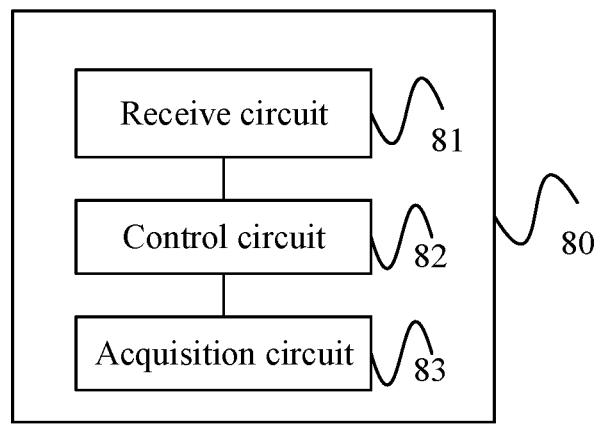
FIG. 13 is a structural diagram of another control apparatus according to the disclosure.

FIG. 13 is a structural diagram of another example control apparatus 80 consistent with the disclosure. As shown in FIG. 13, the control apparatus 80 also includes an acquisition circuit 83. The acquisition circuit 83 is configured to obtain the attitude parameters of the gimbal and the control circuit 82 is configured to adjust the attitude parameters of the UAV according to the attitude parameters of the gimbal.

In some embodiments, the control circuit 82 can be configured to adjust the one or more of the yaw parameters, the pitch parameters, and the roll parameters of the UAV, according to the one or more of the yaw parameters, the pitch parameters, and the roll parameters of the gimbal.

In some embodiments, the control circuit 82 can be configured to adjust the attitude parameters of the UAV according to the attitude parameters of the gimbal, such that landing gears of the UAV are outside the photographing range of the photographing device provided at the gimbal.

In some other embodiments, the control circuit 82 can be configured to adjust the attitude parameters of the UAV according to the attitude parameters of the gimbal, such that there is no stop position when the gimbal is rotating.

In some embodiments, the acquisition circuit 83 can be configured to obtain the yaw parameters of the gimbal provided at the UAV. Accordingly, the control circuit 82 can be configured to adjust the yaw parameters of the UAV according to the yaw parameters of the gimbal. In some embodiments, the rotation of the UAV in the yaw direction can be controlled according to the yaw parameters of the gimbal, such that the UAV can rotate along with the rotation of the gimbal. The yaw parameters can include at least one of the yaw angle or the yaw rotation speed. For example, the control circuit 82 can be configured to adjust the yaw angle of the UAV according to the yaw angle of the gimbal, such that the yaw angle of the UAV can be consistent with the yaw angle of the gimbal.

The principles and implementation manners of the control apparatus in FIG. 13 are similar to those of the control method shown in FIGS. 1 and 4, and details thereof are omitted herein.

Figure 14:
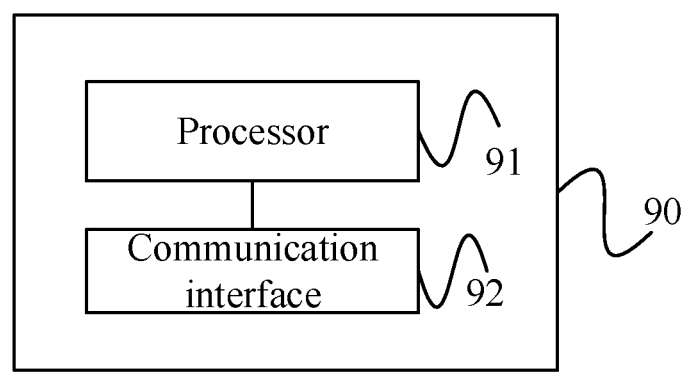
FIG. 14 is a structural diagram of a control device according to the disclosure.

FIG. 14 is a structural diagram of an example control device 90 consistent with the disclosure. The control device can include the flight controller or a processing device having processing capabilities. As shown in FIG. 14, the control device 90 includes one or more processors 91 working individually or in cooperation. The one or more processors 91 are configured to obtain attitude parameters of a gimbal provided at a UAV and adjust attitude parameters of the UAV according to the attitude parameters of the gimbal. The attitude parameters can include one or more of yaw parameters, pitch parameters, and roll parameters.

In some embodiments, the one or more processors 91 can be configured to adjust the one or more of the yaw parameters, the pitch parameters, and the roll parameters of the UAV, according to the one or more of the yaw parameters, the pitch parameters, and the roll parameters of the gimbal.

In some embodiments, one or more processors 91 can be configured to adjust the attitude parameters of the UAV according to the attitude parameters of the gimbal, such that landing gears of the UAV are outside the photographing range of the photographing device provided at the gimbal.

In some other embodiments, one or more processors 91 can be configured to adjust the attitude parameters of the UAV according to the attitude parameters of the gimbal, such that there is no stop position when the gimbal is rotating.

The principles and implementation manners of the control device described above are similar to those of the control method shown in FIG. 1, and details thereof are omitted herein.

According to the disclosure, the control device can obtain the attitude parameters of the gimbal provided at the UAV and adjust the attitude parameters of the UAV according to the attitude parameters of the gimbal, i.e., the attitude parameters of the UAV can change passively with the change of the attitude parameters of the gimbal, such that the gimbal control methods can be more simple and direct, the control methods of the gimbal can be enriched, and the flexibility of gimbal control methods can be improved. Furthermore, the lag in the attitude adjustment of the gimbal relative to the attitude adjustment of the vehicle body of the UAV can be avoided, and when the attitude of the gimbal changes along with the change of the attitude of the vehicle body of the UAV, the problem of overshoot that the gimbal may generate under inertia can be avoided, such that the gimbal can rotate and stop more smoothly, the stability of the photographing device provided at the gimbal can be ensured, and the stability of the photographing screen of the photographing device can be improved.

In some embodiments, the one or more processors 91 can be configured to obtain the yaw parameters of the gimbal provided at the UAV. The one or more processors 91 can be configured to adjust the yaw parameters of the UAV according to the yaw parameters of the gimbal. In some embodiments, the rotation of the UAV in the yaw direction can be controlled according to the yaw parameters of the gimbal, such that the UAV can rotate along with the rotation of the gimbal. The yaw parameters can include at least one of the yaw angle or the yaw rotation speed. The one or more processors 91 can be configured to adjust the yaw angle of the UAV according to the yaw angle of the gimbal, such that the yaw angle of the UAV can be consistent with the yaw angle of the gimbal.

The principles and implementation manners of the control device described above are similar to those of the control method shown in FIG. 4, and details thereof are omitted herein.

According to the disclosure, the control device can obtain the yaw parameters of the gimbal provided at the UAV and adjust the yaw parameters of the UAV according to the yaw parameters of the gimbal, i.e., the yaw parameters of the UAV can change passively with the change of the yaw parameters of the gimbal, such that the rotation of the gimbal in the yaw direction will not be limited by the yaw parameters of the UAV, and the gimbal can rotate in the yaw direction without stop position. Furthermore, compared to the situation that the yaw parameters of the gimbal are changed passively with the changes of the yaw parameters of the UAV, the overshoot of the gimbal in the yaw direction due to the inertia when the UAV stops rotating around the yaw axis of the vehicle body can be avoided, such that the gimbal can rotate and stop more smoothly, the stability of the photographing device provided at the gimbal can be ensured, and the stability of the photographing screen of the photographing device can be improved.

In some embodiments, the control device can be the flight controller. The one or more processors 91 can be configured to obtain the pitch parameters of the gimbal provided at the UAV, and adjust the pitch parameters of the UAV according to the pitch parameters of the gimbal. The pitch parameters can include at least one of the pitch angle or the pitch rotation speed.

The principles and implementation manners of the control device described above are similar to those of the control method shown in FIG. 5, and details thereof are omitted herein.

In some embodiments, the control device can be the flight controller. The control device 90 also includes a communication interface 92 that communicates with the processor 91. The communication interface 92 is configured to receive an attitude control command sent by the control terminal and the one or more processors 91 is configured to adjust the attitude parameters of the gimbal according to the attitude control command. The attitude control command can include at least one of a command for adjusting the angles of the attitude parameters of the gimbal or a command for adjusting the angular velocities of the attitude parameters of the gimbal.

In some embodiments, the communication interface 92 can be configured to receive at least one of a pitch control command, a roll control command, or a yaw control command sent by the control terminal. Accordingly, the one or more processors 91 can be configured to perform at least one of the following processes: adjusting the pitch parameters of the gimbal according to the pitch control command sent by the control terminal, adjusting the roll parameters of the gimbal according to the roll control command sent by the control terminal, or adjusting the yaw parameters of the gimbal according to the yaw control command sent by the control terminal.

In some embodiments, the pitch control command can include manipulating the pitch lever or the pitch button of the control terminal to generate the amount of control lever displacement. The roll control command can include manipulating the roll lever or the roll button of the control terminal to generate the amount of control lever displacement. The yaw control command can include manipulating the yaw lever or the yaw button of the control terminal to generate the amount of control lever displacement.

In some embodiments, the one or more processors 91 can further be configured to control the attitude of the gimbal, such that the photographing device provided at the gimbal can perform tracking photography on the target object.

The principles and implementation manners of the control device described above are similar to those of the control method shown in FIG. 7, and details thereof are omitted herein.

In some embodiments, the control device can be the flight controller. As shown in FIG. 14, the control device 90 includes the one or more processors 91 and the communication interfaces 92. The one or more processors 91 can work individually or in cooperation and are communicatively connected to the communication interfaces 92. The communication interfaces 92 is configured to receive the attitude control command sent by the control terminal. The one or more processors 91 is configured to adjust the attitude parameters of the gimbal provided at the UAV according to the attitude control command. The attitude parameters can include at least one of the yaw parameters and the roll parameters.

In some embodiments, the attitude parameters can also include the pitch parameters. In some embodiments, the yaw parameters can include at least one of the yaw angle and the yaw rotation speed. The pitch parameters can include at least one of the pitch angle and the pitch rotation speed. The roll parameters can include at least one of the roll angle and the roll rotation speed. The attitude control command includes at least one of the command for adjusting the angles of the attitude parameters of the gimbal or the command for adjusting the angular velocities of the attitude parameters of the gimbal.

The communication interfaces 92 can be configured to receiving at least one of the pitch control command, the roll control command, and the yaw control command sent by the control terminal. Accordingly, the one or more processors 91 can be configured to perform at least one of the following processes: adjusting the pitch parameters of the gimbal according to the pitch control command sent by the control terminal, adjusting the roll parameters of the gimbal according to the roll control command sent by the control terminal, or adjusting the yaw parameters of the gimbal according to the yaw control command sent by the control terminal. The pitch control command can include the amount of control lever displacement generated by manipulating the pitch lever or the pitch button of the control terminal. The roll control command can include the amount of control lever displacement generated by manipulating the roll lever or the roll button of the control terminal. The yaw control command can include the amount of control lever displacement generated by manipulating the yaw lever or the yaw button of the control terminal.

The principles and implementation manners of the control device described above are similar to those of the control method shown in FIG. 8, and details thereof are omitted herein.

According to the disclosure, the control device can obtain the attitude control command sent by the ground control terminal and adjust the attitude parameters of the gimbal according to the attitude control command, such that the control terminal can directly adjust the attitude parameters of the gimbal (for example, one or more of the yaw parameters, the pitch parameters and the roll parameters), and the control methods of the gimbal can be enriched. Furthermore, the lag in the attitude adjustment of the gimbal relative to the attitude adjustment of the vehicle body of the UAV can be avoided, and the phenomenon that the image shoot by the photographing device appears to be "not following the hands" can also be avoided. In addition, the attitude of the gimbal will no longer change along with the change of the attitude of the vehicle body of the UAV, the problem of overshoot that the gimbal may generate under inertia can be avoided, such that the gimbal can rotate and stop more smoothly, the stability of the photographing device provided at the gimbal can be ensured, and the stability of the photographing screen of the photographing device can be improved.

In some embodiments, the control device can be the flight controller. The one or more processors 91 can also be configured to obtain the attitude parameters of the gimbal and adjust the attitude parameters of the UAV according to the attitude parameters of the gimbal.

In some embodiments, the one or more processors 91 can be configured to adjust the one or more of the yaw parameters, the pitch parameters, and the roll parameters of the UAV, according to the one or more of the yaw parameters, the pitch parameters, and the roll parameters of the gimbal.

In some embodiments, the one or more processors 91 can be configured to adjust the attitude parameters of the UAV according to the attitude parameters of the gimbal, such that landing gears of the UAV are outside the photographing range of the photographing device provided at the gimbal.

In some other embodiments, the one or more processors 91 can be configured to adjust the attitude parameters of the UAV according to the attitude parameters of the gimbal, such that there is no stop position when the gimbal is rotating.

In some embodiments, the one or more processors 91 can be configured to obtain the yaw parameters of the gimbal provided at the UAV. Accordingly, the one or more processors 91 can be configured to adjust the yaw parameters of the UAV according to the yaw parameters of the gimbal. In some embodiments, one or more processors 91 can be configured to control the rotation of the UAV in the yaw direction according to the yaw parameters of the gimbal, such that the UAV can rotate along with the rotation of the gimbal. The yaw parameters can include at least one of the yaw angle or the yaw rotation speed. For example, the one or more processors 91 can be configured to adjust the yaw angle of the UAV according to the yaw angle of the gimbal, such that the yaw angle of the UAV can be consistent with the yaw angle of the gimbal.

The principles and implementation manners of the control device described above are similar to those of the control method shown in FIGS. 1 and 4, and details thereof are omitted herein.

A control terminal consistent with the disclosure can have two operation modes. An operation mode (i.e., a gimbal control mode) is to adjust the attitude parameters of the gimbal, such as the pitch parameters, the roll parameters, and the yaw parameters of the gimbal. Another operation mode (i.e., a UAV control mode) is to adjust the attitude parameters of the UAV, such as the pitch parameters, the roll parameters, and the yaw parameters of the UAV. In some embodiments, the control terminal can be provided with a mode switching button or key, and the user can change the operation mode of the remote controller by pressing the mode switching button or key.

When the operation mode of the control terminal is to adjust the attitude parameters of the gimbal, the control terminal can send the attitude control command to the flight controller or the control circuit controlling the rotation of the gimbal, such that the flight controller or the control circuit controlling the rotation of the gimbal can adjust the attitude parameters of the gimbal according to the attitude control command. The attitude control command can include at least one of a command for adjusting the angles of the attitude parameters of the gimbal or a command for adjusting the angular velocities of the attitude parameters of the gimbal.

The attitude control command can include one or more of a pitch control command, a roll control command, or a yaw control command. If the control terminal sends the pitch control command to the flight controller or the control circuit controlling the rotation of the gimbal, the flight controller or the control circuit controlling the rotation of the gimbal can adjust the pitch parameters of the gimbal. If the control terminal sends the roll control command to the flight controller or the control circuit controlling the rotation of the gimbal, the flight controller or the control circuit controlling the rotation of the gimbal can adjust the roll parameters of the gimbal. If the control terminal sends the yaw control command to the flight controller or the control circuit controlling the rotation of the gimbal, the flight controller or the control circuit controlling the rotation of the gimbal can adjust the yaw parameters of the gimbal.

When the operation mode of the control terminal is to adjust the attitude parameters of the UAV, the control terminal can send the attitude control command to the flight controller, such that the flight controller can adjust the attitude parameters of the UAV according to the attitude control command. The attitude control command can include at least one of a command for adjusting the angles of the attitude parameters of the UAV or a command for adjusting the angular velocities of the attitude parameters of the UAV.

The attitude control command can include one or more of a pitch control command, a roll control command, or a yaw control command. If the control terminal sends the pitch control command to the flight controller, the flight controller can adjust the pitch parameters of the UAV. If the control terminal sends the roll control command to the flight controller, the flight controller can adjust the roll parameters of the UAV. If the control terminal sends the yaw control command to the flight controller, the flight controller can adjust the yaw parameters of the UAV.

The pitch control command can include the amount of control lever displacement generated by manipulating the pitch lever or the pitch button of the control terminal. The roll control command can include the amount of control lever displacement generated by manipulating the roll lever or the roll button of the control terminal. The yaw control command can include the amount of control lever displacement generated by manipulating the yaw lever or the yaw button of the control terminal.

The control terminal can include, but is not limited to, a remote controller, a smart phone/cell phone, a tablet computer, a personal digital assistant (PDA), a laptop, a desktop computer, a media content player, a video game station/system, a virtual reality system, an augmented reality system, a wearable device, for example, a watch, an eyeglass, a glove, a headwear (such as, for example, a hat, a helmet, a virtual reality headset, an augmented reality headset, a head mounted device (HMD), a headband), a pendant, an armband, a leg ring, shoes, or a vest, a gesture recognition device, a microphone, any electronic device that can provide or render image data, or a combination thereof.

According to the disclosure, the control terminal can send the attitude control command to the UAV, and the flight controller or the control circuit controlling the rotation of the gimbal of the UAV can adjust the attitude parameters of the gimbal according to the attitude control command, such that the control terminal can directly adjust the attitude parameters of the gimbal. In addition, compared to that the control terminal adjusts the attitude parameters of the UAV first and then the flight controller adjusts the attitude parameters of the gimbal according to the attitude parameters of the UAV, the timeliness and flexibility of the control terminal to control the gimbal can be improved.

Figure 15:
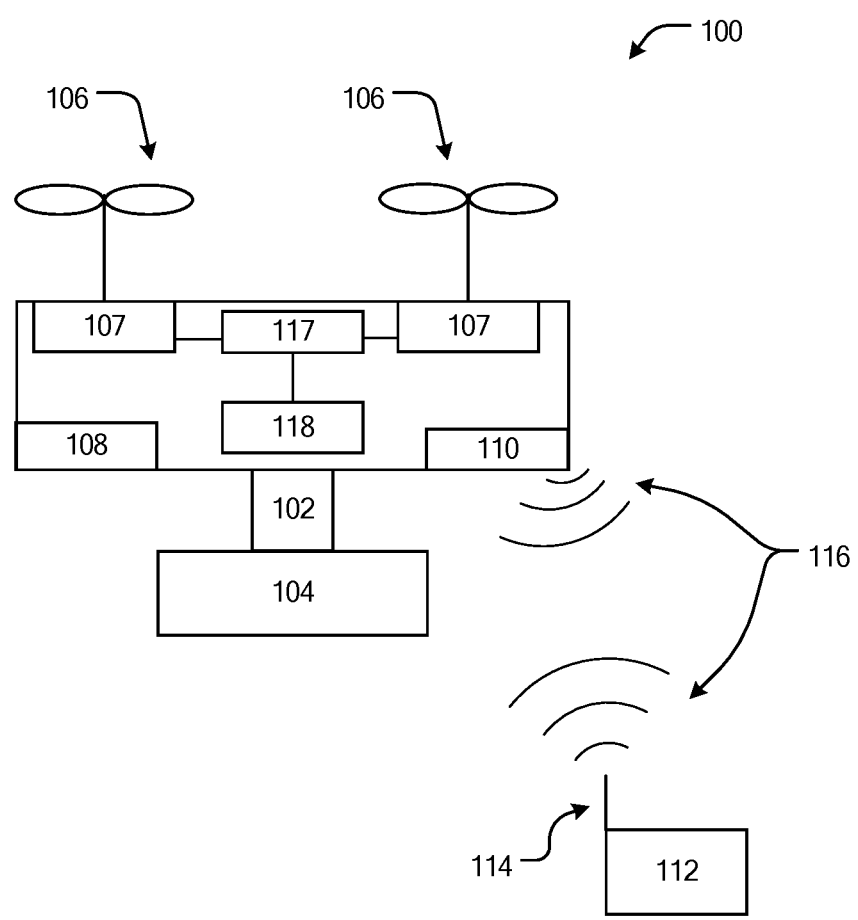
FIG. 15 is a structural diagram of a UAV according to the disclosure.

FIG. 15 is a structural diagram of an example UAV 100 consistent with the disclosure. As shown in FIG. 15, the UAV 100 includes a vehicle body, a power system, and a control device 118. The power system includes at least one of motors 107, propellers 106, and an electronic governor 117. The power system can be provided at the vehicle body for providing the flight power. The control device 118 can be any of the control devices described in FIG. 14. In some embodiments, the control device 118 can be the flight controller.

In some embodiments, as shown in FIG. 15, the UAV 100 also includes a sensor system 108, a communication system 110, a support device 102, and a photographing device 104. The sensor system can be configured to detect the speed, the acceleration, and/or the attitude parameters (such as the pitch angle, the roll angle, the yaw angle, and/or the like) of the UAV or the attitude parameters (such as the pitch angle, the roll angle, the yaw angle, and/or the like of the gimbal. The support device 102 can include a gimbal, and the communication system 110 can include a receiver and/or a transmitter. The receiver can be configured to receive wireless signals transmitted by an antenna 114 of a ground station 112, and the communication system 110 can also send the wireless signals (such as image information, status information of the UAV, and/or the like) to the ground station 112.

The principles and implementation manners of the control device 118 are similar to those of the control device shown in FIG. 14, and details thereof are omitted herein.

The disclosed systems, apparatuses, and methods may be implemented in other manners not described here. For example, the devices described above are merely illustrative. For example, the division of units may only be a logical function division, and there may be other ways of dividing the units. For example, multiple units or components may be combined or may be integrated into another system, or some features may be ignored, or not executed. Further, the coupling or direct coupling or communication connection shown or discussed may include a direct connection or an indirect connection or communication connection through one or more interfaces, devices, or units, which may be electrical, mechanical, or in other form.

The units described as separate components may or may not be physically separate, and a component shown as a unit may or may not be a physical unit. That is, the units may be located in one place or may be distributed over a plurality of network elements. Some or all of the components may be selected according to the actual needs to achieve the object of the present disclosure.

In addition, the functional units in the various embodiments of the present disclosure may be integrated in one processing unit, or each unit may be an individual physically unit, or two or more units may be integrated in one unit.

A method consistent with the disclosure can be implemented in the form of computer program stored in a non-transitory computer-readable storage medium, which can be sold or used as a standalone product. The computer program can include instructions that enable a computer device, such as a personal computer, a server, or a network device, to perform part or all of a method consistent with the disclosure, such as one of the example methods described above. The storage medium can be any medium that can store program codes, for example, a USB disk, a mobile hard disk, a read-only memory (ROM), a random access memory (RAM), a magnetic disk, or an optical disk.

It will be apparent to those skilled in the art that the division of the above functional modules are considered as example only for the convenience and conciseness of the description. In practical applications, the above functions can be allocated to different functional modules according to the requirements. That is, the internal structure of the device can be divided into different functional modules to complete some or all of the functions described above.

Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the invention being indicated by the following claims. Other modifications of, or equivalents to the disclosed embodiments are intended to be encompassed within the scope of the present disclosure.

What is claimed is:

1. A control method of an unmanned aerial vehicle (UAV) performed by a control device, comprising:
    obtaining one or more attitude parameters of a gimbal of the UAV, the gimbal being configured to carry a photographing device, the one or more attitude parameters of the gimbal including a yaw parameter of the gimbal; and
    adjusting, with aid of a power system of the UAV provided at a vehicle body of the UAV, one or more attitude parameters of the vehicle body according to the one or more attitude parameters of the gimbal, including:
    controlling, with aid of the power system, the vehicle body to rotate in a yaw direction according to the yaw parameter of the gimbal, to cause the vehicle body to rotate along with the gimbal.

2. The method of claim 1, wherein adjusting the one or more attitude parameters of the vehicle body further includes:
    adjusting the one or more attitude parameters of the vehicle body according to the one or more attitude parameters of the gimbal to prevent landing gears of the UAV to be in a photographing range of a photographing device carried by the gimbal.

3. The method of claim 1, wherein adjusting the one or more attitude parameters of the vehicle body further includes:
    adjusting the one or more attitude parameters of the vehicle body according to the one or more attitude parameters of the gimbal to prevent the gimbal from reaching stop position while rotating.

4. The method of claim 1, wherein the one or more attitude parameters of the gimbal further include at least one of a pitch parameter or a roll parameter of the gimbal, and the one or more attitude parameters of the vehicle body include at least one of a yaw parameter, a pitch parameter, or a roll parameter of the vehicle body.

5. The method of claim 4, wherein:
the yaw parameter of the gimbal includes at least one of a yaw angle or a yaw rotation speed of the gimbal;
the pitch parameter of the gimbal includes at least one of a pitch angle or a pitch rotation speed of the gimbal;
the roll parameter of the gimbal includes at least one of a roll angle or a roll rotation speed of the gimbal;
the yaw parameter of the vehicle body includes at least one of a yaw angle or a yaw rotation speed of the vehicle body;
the pitch parameter of the vehicle body includes at least one of a pitch angle or a pitch rotation speed of the vehicle body; and
the roll parameter of the vehicle body includes at least one of a roll angle or a roll rotation speed of the vehicle body.

6. The method of claim 1, wherein controlling the vehicle body to rotate in the yaw direction includes:
adjusting a yaw angle of the vehicle body according to a yaw angle of the gimbal, to maintain the yaw angle of the vehicle body to be consistent with the yaw angle of the gimbal.

7. The method of claim 1, further comprising:
receiving an attitude control command sent by a control terminal; and
adjusting the one or more attitude parameters of the gimbal according to the attitude control command.

8. The method of claim 7, wherein the attitude control command includes at least one of:
a command for adjusting one or more angles of the one or more attitude parameters of the gimbal; or
a command for adjusting one or more angular velocities of the one or more attitude parameters of the gimbal.

9. The method of claim 7, adjusting the one or more attitude parameters of the gimbal according to the attitude control command includes:
adjusting the yaw parameter of the gimbal based on a yaw control command sent by the control terminal;
adjusting a roll parameter of the gimbal based on a roll control command sent by the control terminal; and
adjusting a pitch parameter of the gimbal based on a pitch control command sent by the control terminal.

10. The method of claim 9, wherein:
the pitch control command includes an amount of pitch control lever displacement generated by manipulating a pitch lever or a pitch button of the control terminal;
the yaw control command includes an amount of yaw control lever displacement generated by manipulating a yaw lever or a yaw button of the control terminal; and
the roll control command includes an amount of roll control lever displacement generated by manipulating a roll lever or a roll button of the control terminal.

11. A control device comprising:
one or more processors individually or collectively configured to:
obtain one or more attitude parameters of a gimbal of an unmanned aerial vehicle (UAV), wherein obtaining the one or more attitude parameters of the gimbal includes obtaining a yaw parameter of the gimbal, and the UAV including:
a vehicle body;
a power system provided at the vehicle body and configured to provide flight power for the UAV, the power system including a motor and a propeller; and
the gimbal provided at the vehicle body and configured to connect a photographing device to the vehicle body; and
adjust, with aid of the power system, one or more attitude parameters of the vehicle body according to the one or more attitude parameters of the gimbal, including:
controlling, with aid of the power system, the vehicle body to rotate in a yaw direction according to the yaw parameter of the gimbal, to cause the vehicle body to rotate along with the gimbal.

12. The control device of claim 11, wherein the one or more processors are further configured to:
adjust the one or more attitude parameters of the vehicle body according to the one or more attitude parameters of the gimbal to prevent landing gears of the UAV to be in a photographing range of a photographing device carried by the gimbal.

13. The control device of claim 11, wherein the one or more processors are further configured to:
adjust the one or more attitude parameters of the vehicle body according to the one or more attitude parameters of the gimbal to prevent the gimbal from reaching a stop position while rotating.

14. The control device of claim 11, wherein the one or more attitude parameters of the vehicle body include at least one of a yaw parameter, a pitch parameter, or a roll parameter of the vehicle body, and the one or more attitude parameters of the gimbal further include at least one of a pitch parameter or a roll parameter of the gimbal.

15. The control device of claim 14, wherein:
the yaw parameter of the gimbal includes at least one of a yaw angle or a yaw rotation speed of the gimbal;
the pitch parameter of the gimbal includes at least one of a pitch angle or a pitch rotation speed of the gimbal;
the roll parameter of the gimbal includes at least one of a roll angle or a roll rotation speed of the gimbal;
the yaw parameter of the vehicle body includes at least one of a yaw angle or a yaw rotation speed of the vehicle body;
the pitch parameter of the vehicle body includes at least one of a pitch angle or a pitch rotation speed of the vehicle body; and
the roll parameter of the vehicle body includes at least one of a roll angle or a roll rotation speed of the vehicle body.

16. The control device of claim 11, wherein the one or more processors are further configured to:
adjust a yaw angle of the vehicle body according to a yaw angle of the gimbal to maintain the yaw angle of the vehicle body to be consistent with the yaw angle of the gimbal.

17. The control device of claim 11, further comprising:
a communication interface communicatively connected to the one or more processors and configured to receive an attitude control command sent by a control terminal;
wherein the one or more processors are further configured to adjust the one or more attitude parameters of the gimbal according to the attitude control command.

18. The control device of claim 17, wherein the attitude control command includes at least one of:
- a command for adjusting one or more angles of the attitude parameters of the gimbal;
- a command for adjusting one or more angular velocities of the attitude parameters of the gimbal.

19. The control device of claim 17, the one or more processors are further configured to:
- adjust the yaw parameter of the gimbal based on a yaw control command sent by the control terminal;
- adjust a roll parameter of the gimbal based on a roll control command sent by the control terminal; and
- adjust a pitch parameter of the gimbal based on a pitch control command sent by the control terminal.

20. The control device of claim 19, wherein:
- the pitch control command includes an amount of pitch control lever displacement generated by manipulating a pitch lever or a pitch button of the control terminal;
- the yaw control command includes an amount of yaw control lever displacement generated by manipulating a yaw lever or a yaw button of the control terminal; and
- the roll control command includes an amount of roll control lever displacement generated by manipulating a roll lever or a roll button of the control terminal.

* * * * *